US012801381B2

(12) United States Patent
De Vita et al.

(10) Patent No.: US 12,801,381 B2
(45) Date of Patent: Nov. 17, 2026

(54) RUN-TIME RECONFIGURABLE SYSTEM AND METHOD FOR MULTI-CONTEXT NESTED OPERATIONS IN STREAMING DATAFLOW-BASED AI ACCELERATORS

(71) Applicant: STMicroelectronics International N.V., Geneva (CH)

(72) Inventors: Antonio De Vita, Milan (IT); Surinder Pal Singh, Noida (IN); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 63 days.

(21) Appl. No.: 19/064,388

(22) Filed: Feb. 26, 2025

(65) Prior Publication Data

US 2026/0252351 A1 Aug. 27, 2026

(51) Int. Cl.
*G06F 9/30* (2018.01)

(52) U.S. Cl.
CPC ................................ *G06F 9/30007* (2013.01)

(58) Field of Classification Search
CPC ..... G06F 9/30; G06F 9/30007; G06F 9/30076
See application file for complete search history.

(56) References Cited

U.S. PATENT DOCUMENTS

| | | | | |
|---|---|---|---|---|
| 6,607,136 | B1 * | 8/2003 | Atsmon | G06Q 20/40 235/487 |
| 10,380,063 | B2 * | 8/2019 | Tang | G06F 9/4494 |
| 10,417,364 | B2 | 9/2019 | Boesch et al. | |
| 11,636,115 | B2 | 4/2023 | Billa | |
| 2014/0189713 | A1 | 7/2014 | Ben-Kiki et al. | |
| 2018/0189641 | A1 | 7/2018 | Boesch et al. | |
| 2018/0368196 | A1 * | 12/2018 | Gage | H04L 63/0428 |
| 2020/0151028 | A1 | 5/2020 | Sura et al. | |
| 2021/0073170 | A1 | 3/2021 | Liao et al. | |
| 2021/0281618 | A1 | 9/2021 | Mosur et al. | |
| 2022/0101086 | A1 | 3/2022 | Cappetta et al. | |

(Continued)

FOREIGN PATENT DOCUMENTS

| | | | |
|---|---|---|---|
| EP | 4455895 | A1 | 10/2024 |
| JP | 7525101 | B2 | 7/2024 |

*Primary Examiner* — Zachary K Huson
(74) *Attorney, Agent, or Firm* — Seed IP Law Group LLP

(57) ABSTRACT

A hardware accelerator includes a stream switch, a programmable component and multi-context control circuitry. The stream switch streams a data stream to the programmable component and to the multi-context control circuitry. The multi-context control circuitry, in a configured context mode of operation, counts valid data transactions of the data stream streamed to the programmable component, and controls a sequence of processing operations to be performed on the data of the data stream by the programmable component based on the counting of the valid data transactions of the data stream and on stored configured-context mode configuration information. The multi-context control circuitry, in a hybrid context mode of operation, monitors the data stream to read embedded context tags, and controls a sequence of processing operations to be performed on the data based on the embedded context tags, on the counting of the valid data transactions, and stored hybrid-context mode configuration information.

33 Claims, 37 Drawing Sheets

(56) References Cited

U.S. PATENT DOCUMENTS

| | | | |
|---|---|---|---|
| 2023/0100586 | A1 | 3/2023 | Kakaiya et al. |
| 2023/0259578 | A1 | 8/2023 | Sanchez et al. |
| 2023/0315655 | A1 | 10/2023 | Choquette et al. |
| 2024/0176515 | A1 | 5/2024 | Edwards et al. |
| 2024/0281397 | A1 | 8/2024 | Rossi et al. |
| 2024/0354269 | A1 | 10/2024 | De Vita et al. |
| 2026/0003801 | A1* | 1/2026 | Hugosson ............. G06F 9/3877 |

* cited by examiner

```
for (loop_count0=0; loop_count0<LOOP0_COUNT; loop_count0++) {
  func0();
}
for (loop_count1=0; loop_count1<LOOP1_COUNT; loop_count1++) {
  func1();
}
for (repeat_count2=0; repeat_count2<REPEAT_COUNT2; repeat_count2++) {
  for (loop_count2=0; loop_count2<LOOP2_COUNT; loop_count2++) {
    func2();
  }
  for (loop_count1=0; loop_count1<LOOP1_COUNT; loop_count1++) {
    func1();
  }
}
for (repeat_count3=0; repeat_count3<REPEAT_COUNT3; repeat_count3++) {
  for (loop_count3=0; loop_count3<LOOP3_COUNT; loop_count3++) {
    func3();
  }
  for (loop_count0=0; loop_count0<LOOP0_COUNT; loop_count0++) {
    func0();
  }
  for (loop_count1=0; loop_count1<LOOP1_COUNT; loop_count1++) {
    func1();
  }
  for (repeat_count2=0; repeat_count2<REPEAT_COUNT2; j++) {
    for (loop_count2=0; loop_count2<LOOP2_COUNT; loop_count2++) {
      func2();
    }
    for (loop_count1=0; loop_count1<LOOP1_COUNT; loop_count1++) {
      func1();
    }
  }
}
```

FIG. 16

| NAME | DESCRIPTION |
|---|---|
| TYPE | Specifies the function associated with the context |
| COUNT | Number of transactions to be processed before switching to the next context |
| REPEAT_FLAG | Specifies if the context must be repeated |
| JUMP_POINTER | Specifies the next context (REPEAT_FLAG = 1) |
| REPEAT_COUNT | Specifies how many times the context must be repeated |

FIG. 19

| | | | | |
|---|---|---|---|---|
| REGISTERS | | | | |
| BUF_STRMx_VCy | | | | |
| Register Name | Num Registers | Bitfield | Bitfield Name | Description |
| BASE | 1 | [LOG2 (MEM_DEPTH)-1:0] | | Base address in scratchedpad mem |
| RDPTR_THREAD_tid | NTHREADS | [LOG2 (MEM_DEPTH)-1:0] | | Read pointer (updated by thread) |
| WRPTR | 1 | [LOG2 (MEM_DEPTH)-1:0] | | write pointer (updated by stream controller) |
| TRIGGER_LEVEL_tid | NTHREADS | [LOG2 (MEM_DEPTH)-1:0] | | number of words in the buffer until the thread is triggered |
| BUF TO THREAD | 1 | [NUM_THREADS-1:0] | | register specifying the link between a buffer and associated threads to be triggered, each bit corresponds to a thread ID eg. if bit 2 is set, TID2 is requesting trigger |
| BUFFER_PROPERTIES | NTHREADS | [7:0] | | |
| | | [0] | AUTOUPD | Enable autoupdate of read pointer |
| | | [1] | BLKRD | Enable blocking read if buffer is empty |
| Buffer Length | NTHREADS | [15:0] | Buffer Length | Buffer Length for thread |

*FIG. 30*

634

| | 64b Scalar Registers | |
|---|---|---|
| Vector Registers 64b | 32b | 32b |
| vr0 | sr1 | sr0 |
| vr1 | sr3 | sr2 |
| vr2 | sr5 | sr4 |
| vr3 | sr7 | sr6 |
| vr5 | sr9 | sr8 |
| vr6 | sr11 | sr10 |
| vr7 | sr13 | sr12 |
| vr8 | sr15 | sr14 |

| Accumulator registers (256 bit wide, so 16b accum for 4b elements, 64b accum for 16b elements, 128b accum for 32b elements) | |
|---|---|
| acc0 | 1 |

| Zero Overhead Loop Registers | |
|---|---|
| LOOPx | 8 |

FIG. 32

*vmov.s.16.4 vr2, vr0 ; src0 rsh #2* – mov 64b vector with 4b elements in
vector register 0 extending them to 16b each and transfer to
vector register 2, 3, 4, 5 after right shifting each element of vr0 by 2

*vmul.s.8 [stream_out] , [vr2]+1, [stream_in_0]* – signed multiply 8b elements of
vector pointed to by vector register 2 with 8b elements from stream_in_0 and write out result to output stream.
Post increment the address in vr2 by 1

*vmaxreduce.4 [vr3] , [vr2]* – perform a max reduction operation ie. Finds the max 4b element in the vector pointed to
by the vr2 and write the result in the address pointed to by vr3

*add sr2 , sr0 , sr1* – scalar operation adding 2 32b registers, sr0, sr1 and write the result to sr2

*FIG. 33*

| ISA type | 0 | | | | |
|---|---|---|---|---|---|
| BITFIELD NAME | | BITFIELD LEN | BITFIELD | DESC | immediate val |
| dest_operand | mem/reg/stream | 4 | | | 16 |
| src_operand1 | mem/reg/stream _idx | 4 | | | |
| src_operand2 | mem/reg/stream _idx | 4 | | | |
| dest_operand_type | | 1 | | | |
| src1_operand_type | | 1 | | | |
| src1_operand_type | | 1 | | | |
| unsignedness | | 1 | | all ops are signed unless explicitly unsigned ie. Unsignedness is set to 1 | |
| src datawidth | | 3 | | | |
| dst datawidth | | 3 | | | |
| opcode | | 7 | | | |
| ISA type | | 3 | | | |
| | | | | | |

FIG. 34A

| operand_type | encoding |
| --- | --- |
| mem | 0 |
| reg | 1 |
| stream | Special Address |

| bitwidth | | | |
| --- | --- | --- | --- |
| 1 | 0 | 0 | 0 |
| 2 | 0 | 0 | 1 |
| 4 | 0 | 1 | 0 |
| 8 | 0 | 1 | 1 |
| 16 | 1 | 0 | 0 |
| | | | |
| 32 | 1 | 0 | 1 |
| 64 | 1 | 1 | 1 |

*FIG. 34B*

| | | | | |
|---|---|---|---|---|
| Extended ISA type | 0 | | | |
| IMM 32 | | 32 | | |
| PREDICATE | 3 | | | |
| reg_shift_en | 1 | | | To enable either element shift or post increment feature |
| dest element post shift enable | 1 | | | |
| dest element post shift val | 6 | | | |
| src1 element pre shift enable | 1 | | | |
| src1 element pre shift val | 6 | | | |
| src2 element pre shift enable | | | | |
| src2 element pre shift val | | | | |
| PERMUTE ENABLE | | | | |
| RESERVED | | | | |
| TOTAL | | | | |

*FIG. 35A*

| | | |
|---|---|---|
| Extended ISA type | 0 | |
| PREDICATE | 3 | |
| SRC1 POST INCREMENT ENABLE | 1 | |
| SRC1 POST INCREMENT | 6 | |
| SRC2 POST INCREMENT ENABLE | 1 | |
| SRC2 POST INCREMENT | 6 | |
| DST POST INCREMENT ENABLE | 1 | |
| DST POST INCREMENT | 6 | |
| PERMUTE ENABLE | 1 | |
| RESERVED | 7 | |
| TOTAL | | 32 |

*FIG. 35B*

RUN-TIME RECONFIGURABLE SYSTEM AND METHOD FOR MULTI-CONTEXT NESTED OPERATIONS IN STREAMING DATAFLOW-BASED AI ACCELERATORS

BACKGROUND

Technical Field

The present disclosure generally relates to hardware accelerators in stream-based architectures, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators employing stream-based architectures, including convolutional accelerators, are often employed to accelerate the processing of large amounts of data by a DCNN.

BRIEF SUMMARY

In an embodiment, a hardware accelerator includes a stream switch, a programmable component and multi-context control circuitry. The stream switch streams a data stream to the programmable component and to the multi-context control circuitry. The multi-context control circuitry, in a configured context mode of operation, counts valid data transactions of the data stream streamed to the programmable component, and controls a sequence of processing operations to be performed on the data of the data stream by the programmable component based on the counting of the valid data transactions of the data stream and on stored configured-context mode configuration information. The multi-context control circuitry, in a hybrid context mode of operation, monitors the data stream to read embedded context tags, and controls a sequence of processing operations to be performed on the data based on the embedded context tags, on the counting of the valid data transactions, and stored hybrid-context mode configuration information.

In an embodiment, a system comprises a plurality of hardware accelerators. Each hardware accelerator of the plurality of hardware accelerators includes a plurality of programmable components, multi-context control circuitry coupled to the plurality of programmable components, and a stream switch coupled to the plurality of programmable components and to the multi-context control circuitry. The stream switch of a hardware accelerator of the plurality of hardware accelerators, in operation, streams a data stream to a programmable component of the plurality of programmable components of the hardware accelerator and to the multi-context control circuitry of the hardware accelerator. The multi-context control circuitry of the hardware accelerator, in a configured context mode of operation, counts valid data transactions of the data stream streamed to the programmable component and the multi-context control circuitry via the stream switch, and controls a sequence of processing operations to be performed on the data of the data stream by the programmable component based on the counting of the valid data transactions of the data stream and on stored configured-context mode configuration information.

In an embodiment, a method comprises streaming a data stream to a programmable component of a stream-based programmable hardware accelerator via a stream switch, counting valid data transactions of the data stream streamed to the programmable component via the stream switch, and controlling, using multi-context control circuitry in a configured context mode of operation, a sequence of processing operations performed on the data of the data stream by the programmable component based on the counting of the valid data transactions of the data stream and on stored configured-context mode configuration information.

In an embodiment, a non-transitory computer-readable medium stores contents which configure a stream-based programmable hardware accelerator to perform a method. The method comprises streaming a data stream to a stream-based programmable hardware accelerator via a stream switch, counting valid data transactions of the data stream streamed to the stream-based hardware accelerator via the stream switch, and controlling, using multi-context control circuitry in a configured context mode of operation, a sequence of processing operations performed on the data of the data stream by the stream-based hardware accelerator based on the counting of the valid data transactions of the data stream and on stored configured-context mode configuration information.

In an embodiment, a stream-triggered multi-thread accelerator includes a data streaming interface, a memory, vector processing circuitry and scheduling circuitry. The data streaming interface, in operation, receives and transmits data streams of a plurality of data streaming channels. The memory, in operation, stores a plurality of instruction threads. The plurality of instruction threads include wait-for-trigger instructions specifying streaming data trigger thresholds, and instructions having data streaming channels of the plurality of data streaming channels as operands. The vector processing circuitry is coupled to the memory and to the data streaming interface. The vector processing circuitry, in operation, executes instruction threads of the plurality of instruction threads. The scheduling circuitry, in operation, schedules execution of instruction threads of the plurality of instruction threads by the vector processing circuitry based on the streaming data trigger thresholds of the wait-for-trigger instructions.

In an embodiment, a system comprises a stream switch and a plurality of programmable components coupled to the stream switch. The plurality of programmable components includes a stream-triggered multi-thread accelerator. The stream-triggered multi-thread accelerator includes a data streaming interface coupled to the stream switch, a memory, and processing circuitry. The data streaming interface, in operation, receives and transmits data streams of a plurality of data streaming channels. The memory, in operation, stores a plurality of instruction threads. The plurality of instruction threads includes wait-for-trigger instructions specifying streaming data trigger thresholds, and instructions having data streaming channels of the plurality of data streaming channels as operands. The processing circuitry is coupled to the memory and to the data streaming interface. The processing circuitry, in operation, executes instruction threads of the plurality of instruction threads based on the streaming data trigger thresholds of the wait-for-trigger instructions.

In an embodiment, a method comprises streaming data streams of a plurality of data streaming channels to a stream-triggered multi-thread accelerator via a stream switch, and executing instruction threads of a plurality of instruction threads using the stream-triggered multi-thread accelerator. The plurality of instruction threads include wait-for-trigger instructions specifying streaming data trigger thresholds, and instructions having data streaming channels of the plurality of data streaming channels as operands. The executing instruction threads of the plurality of instruction threads includes scheduling execution of instruction threads of the plurality of instruction threads based on the streaming data trigger thresholds of the wait-for-trigger instructions.

In an embodiment, a non-transitory computer-readable medium's contents configure a stream-triggered multi-thread accelerator to perform a method. The method comprises receiving data streams of a plurality of data streaming channels via a stream switch and executing instruction threads of a plurality of instruction threads. The plurality of instruction threads include wait-for-trigger instructions specifying streaming data trigger thresholds, and instructions having data streaming channels of the plurality of data streaming channels as operands. The executing instruction threads of the plurality of instruction threads includes scheduling execution of instruction threads of the plurality of instruction threads based on the streaming data trigger thresholds of the wait-for-trigger instructions. In an embodiment, the plurality of data streaming channels are virtual data streaming channels.

BRIEF DESCRIPTION OF THE SEVERAL VIEWS OF THE DRAWINGS

One or more embodiments are described hereinafter with reference to the accompanying drawings.

FIGS. 16 and 17 are conceptual diagrams illustrating an example of using C-code to implement configured context-based processing in a stream-based hardware accelerator.

FIGS. 18 and 19 are conceptual diagrams illustrating example configured context-based processing information that may be stored or retrieved by a stream-based hardware accelerator.

FIGS. 30 and 31 are conceptual diagrams illustrating an example of buffering of data processed by a stream-triggered multi-thread accelerator according to an embodiment.

FIG. 32 is a conceptual diagram illustrating an example configuration of a register files according to an embodiment.

FIG. 33 is a conceptual diagram illustrating example instructions of an instruction set architecture according to an embodiment.

FIGS. 34A and 34B are conceptual diagrams illustrating an example configuration of an instruction set architecture according to an embodiment.

FIGS. 35A and 35B are conceptual diagrams illustrating extended attributes of a 64 bit instruction according to an embodiment.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
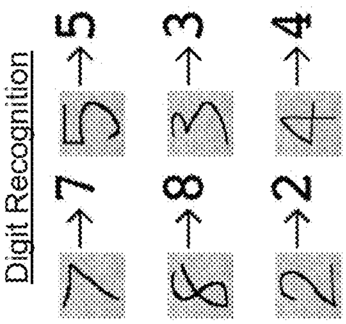
FIG. 1 is a conceptual diagram illustrating a digit recognition task.
Figure 2:
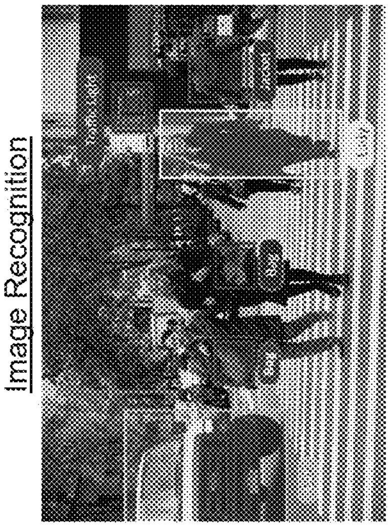
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
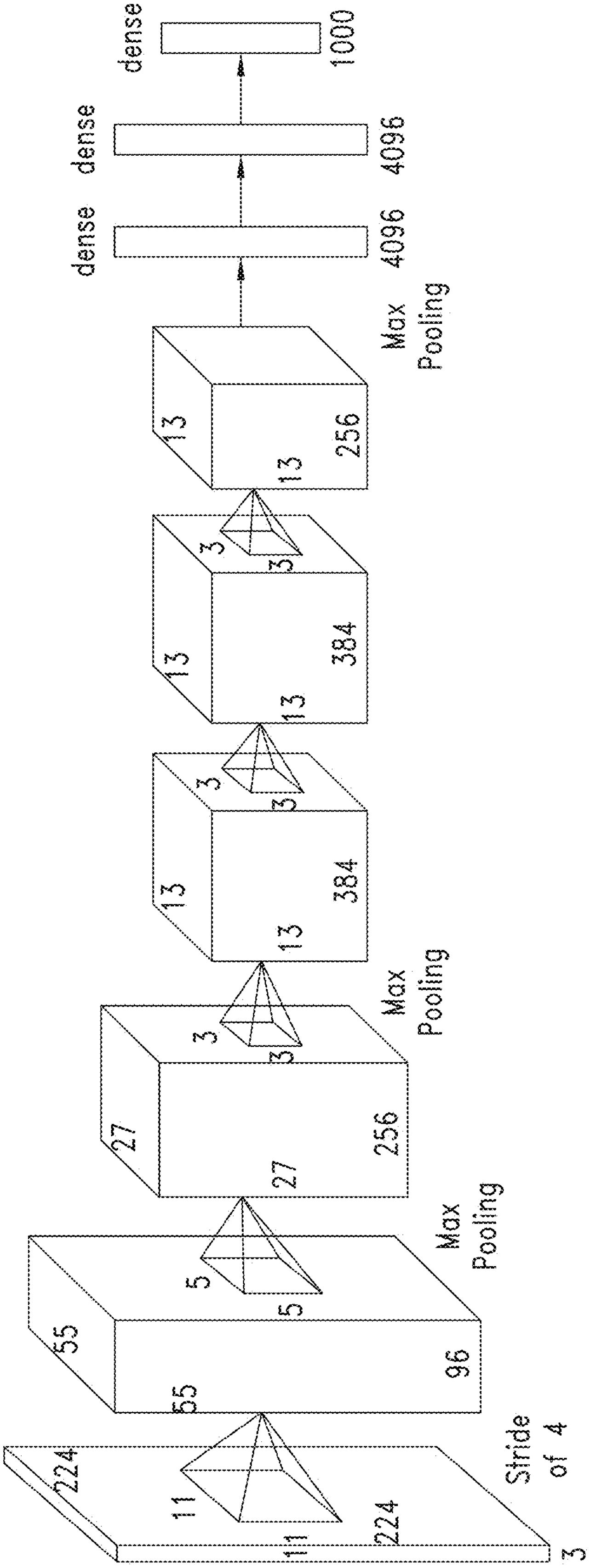
FIG. 3 is a conceptual diagram illustrating an example of a CNN.

CNNs are specific types of deep neural networks (DNN) with one or multiple layers which perform a convolution on a multi-dimensional feature data tensor (e.g., a three-dimensional data tensor having width x height x depth). The first layer is an input layer and the last layer is an output layer. The intermediate layers may be referred to as hidden layers. The most used layers are convolutional layers, fully connected or dense layers, and pooling layers (max pooling, average pooling, etc.). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
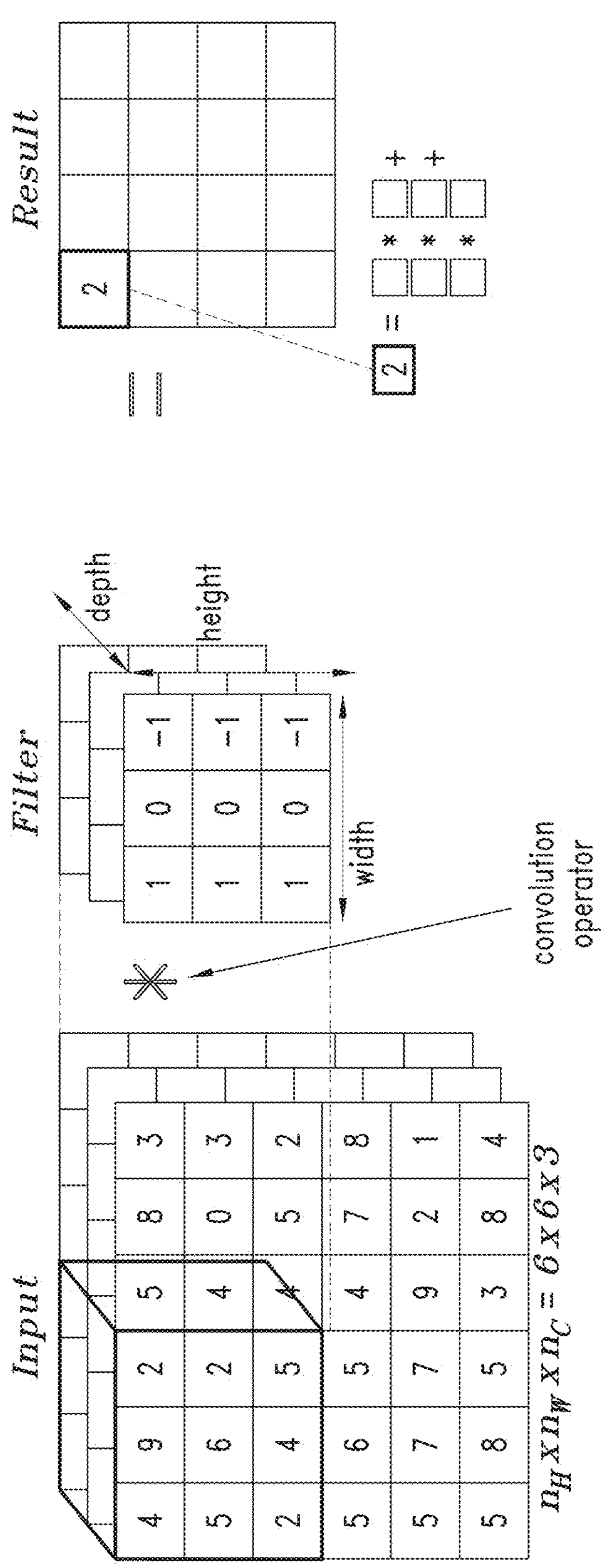
FIG. 4 is a conceptual diagram illustrating an example application of a kernel to a feature map.

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating an example application of a kernel to a feature map, producing a two-dimensional feature map having a height of 4 and a width of 4.

Figure 5:
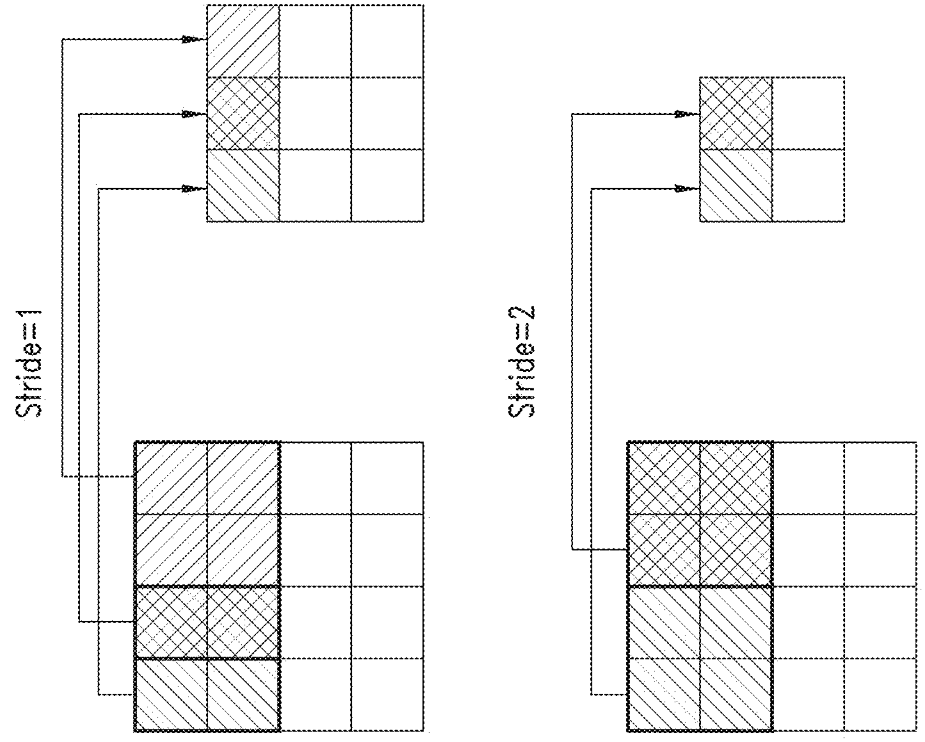
FIG. 5 is a conceptual diagram comparing a stride of 1 and a stride of 2.
Figure 6:
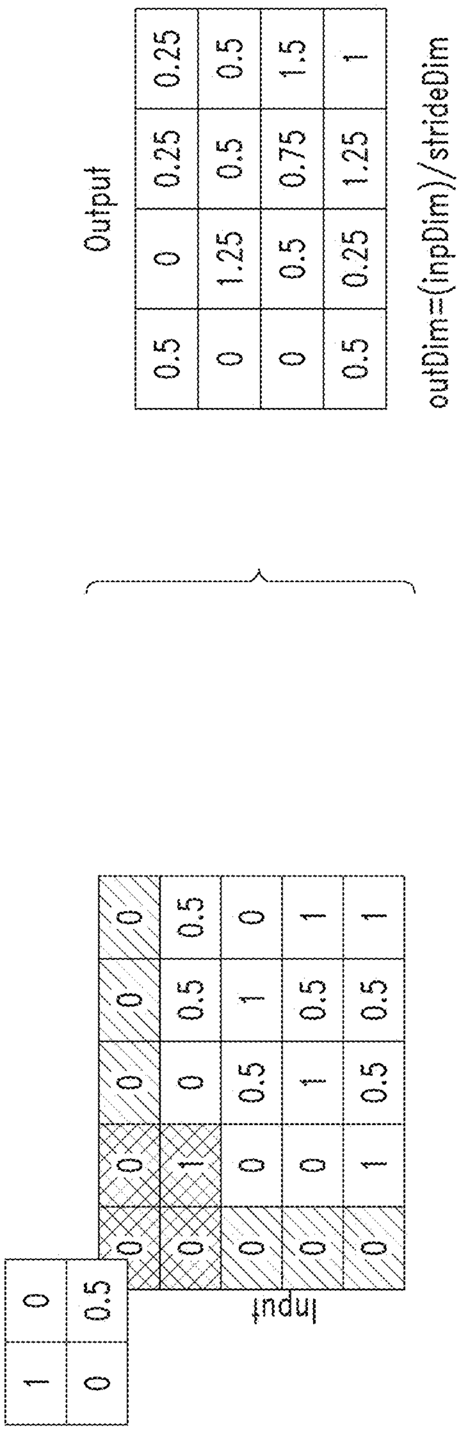
FIG. 6 is a conceptual diagram illustrating application of padding to an input feature map.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters. The stride hyper-parameter indicates a step-size used to slide kernels across an input feature map. FIG. 5 is a conceptual diagram comparing a stride of 1 and a stride of 2. The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map.

Figure 7:
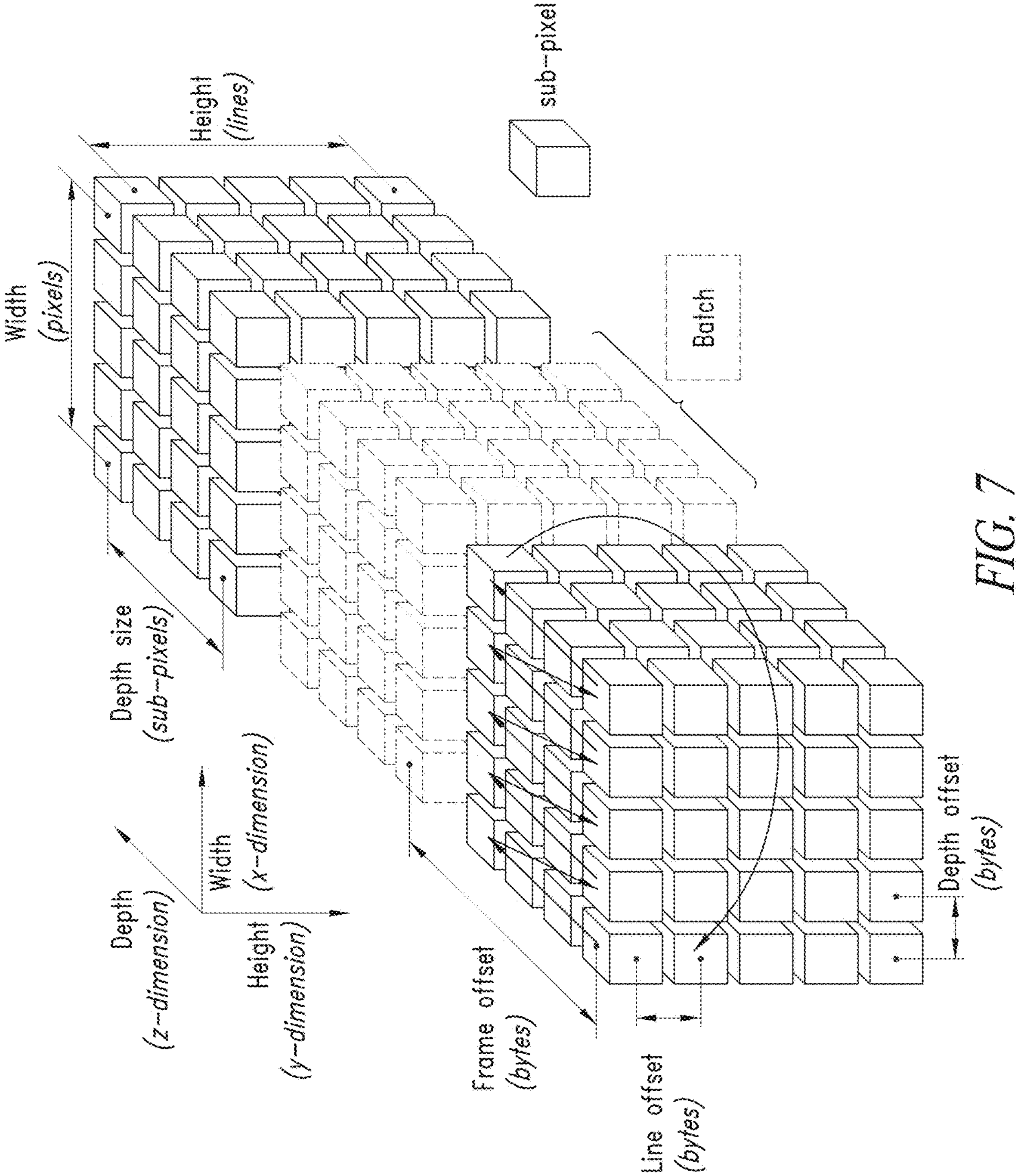
FIG. 7 is a conceptual diagram illustrating the concept of loading feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
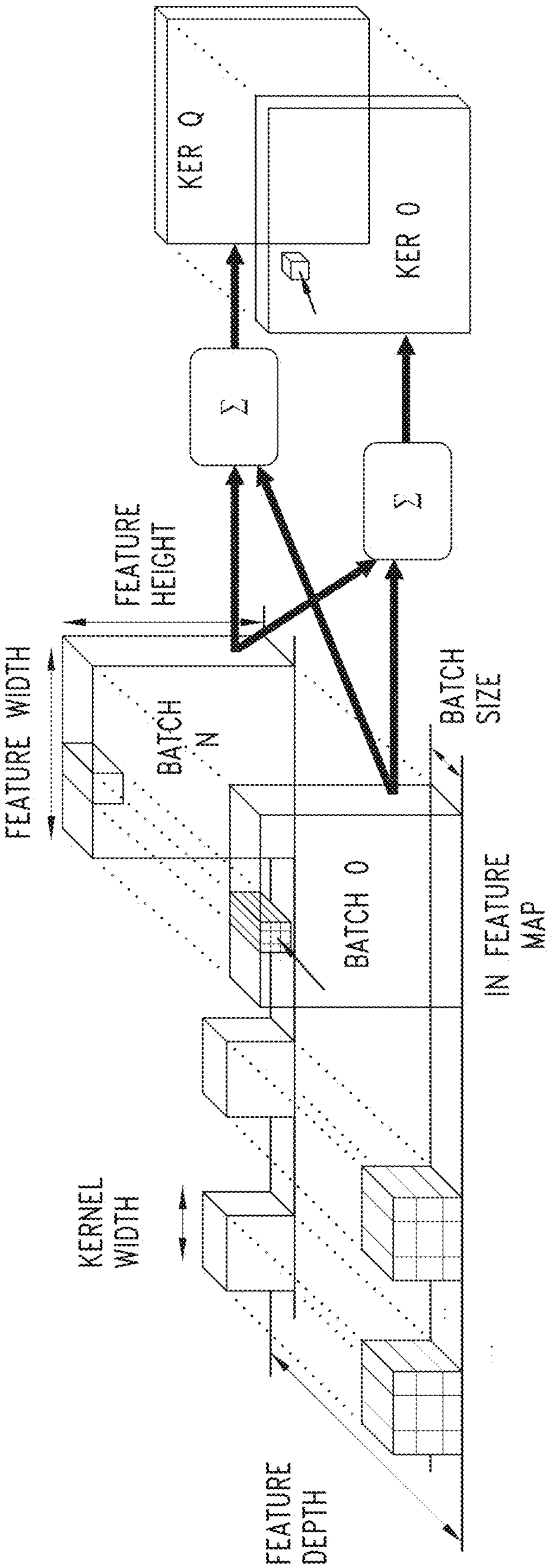
FIG. 8 is a conceptual diagram illustrating the concept of batch processing of a convolution.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9:
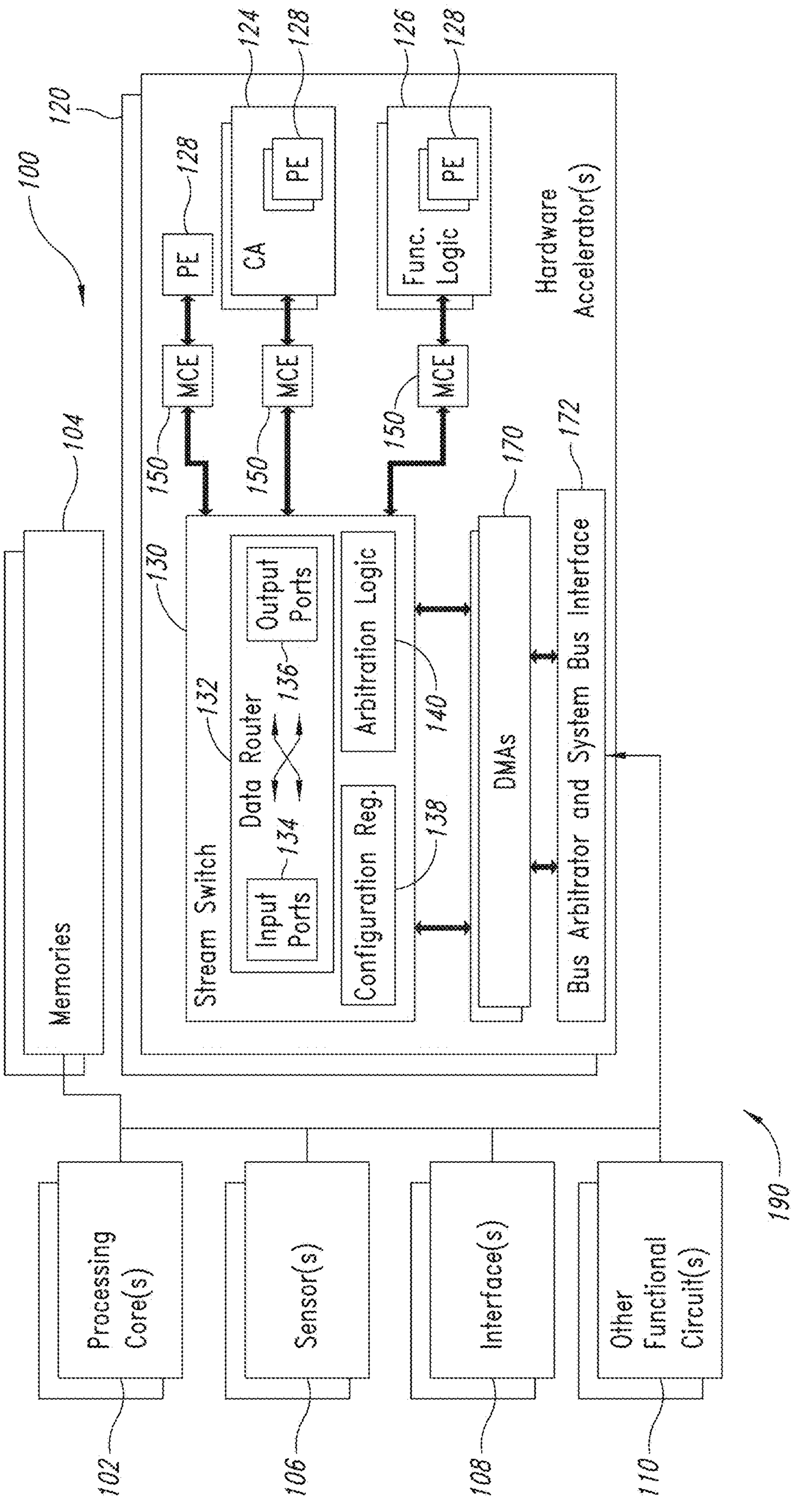
FIG. 9 is a functional block diagram of an electronic device or system employing a multi-context engine according to an embodiment.

FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 may include one or more sensors 106 (e.g., image sensors, audio sensors, accelerometers, pressure sensors, temperature sensors, etc.), one or more interfaces 108 (e.g., wireless communication interfaces, wired communication interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to the various components of the system 100. Proprietary bus systems and interfaces may be employed, such as Advanced eXtensible Interface (AXI) bus systems and interfaces.

The system 100 also includes one or more hardware accelerators 120, which, in operation, accelerate the performance of one or more operations, such as operations associated with implementing a CNN. The hardware accelerator 120 as illustrated includes one or more convolutional accelerators 124, one or more functional logic circuits 126, and one or more processing elements 128, to facilitate efficient performance of convolutions and other operations associated with layers of a CNN. The convolutional accelerator 120 and the other functional logic circuits 124 as illustrated also comprise one or more processing elements 128. The processing elements 128, in operation, perform processing operations, such as processing operations facilitating the performing of convolutions by a convolutional accelerator 124 or other functional operations performed by a functional logic circuit 126, or other processing operations associated with the hardware accelerator.

The hardware accelerator 120 as illustrated also includes a stream switch 130, and one or more streaming engines or DMA controllers 170. The stream switch 130, in operation, streams data between the convolutional accelerators 124, the functional logic circuits 126, the processing elements 128, and the streaming engines or DMAs 170. A bus arbitrator and system bus interface 172 facilitates transfers of data, such as streaming of data, between the hardware accelerator 120 and other components of the system 100, such as the processing cores 102, the memories 104, the sensors 106, the interfaces 108, and the other functional circuits 110, for example via the bus system 190.

To facilitate the transfer of data streams in an efficient manner in the hardware accelerator 120, the illustrated hardware accelerator 120 includes a stream switch 130 which streams data using virtual data channels between a set of input ports and a set of output ports. The use of virtual channels facilitates using the stream switch 130 to couple more source and destination IPs together than the number of available physical ports. In addition, employing virtual channels facilitates improving the efficiency in terms of area, power, and latency as compared to conventional crossbar and NoC switching. The stream switch 130 as illustrated includes a data router 132, which includes a number of input ports 134 and a number of output ports 136. Configuration registers 138 and arbitration logic 140 are employed to manage the allocation of bandwidth of the data router 132 to the virtual channels. Flow control mechanisms may be employed.

A stream-based hardware accelerator, such as an accelerator 120 of FIG. 9, is normally programmed to perform a fixed operation on an incoming data stream. However, in many applications, multiple different types of operations are to be performed on a same set of input data. When a stream-based processing system operates on incoming data according to different computational patterns, the operation is typically segmented into epochs depending on the type of function to be performed, so that the various components of the system (e.g., stream switch 112, convolutional accelerators 124, functional logic circuits 126, processing elements 128, etc.) may be programmed or reprogrammed to provide the desired functionality.

Figure 10:
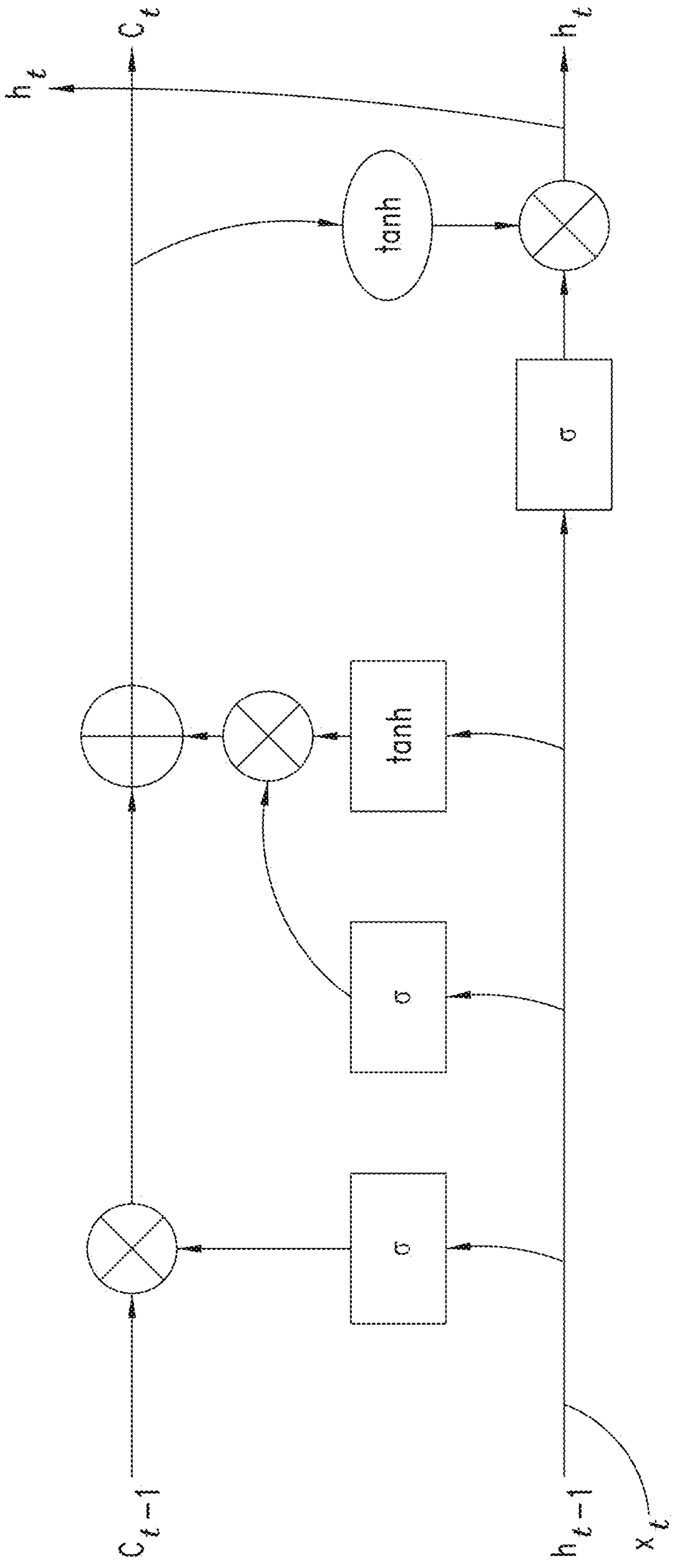
FIG. 10 (Prior Art)
FIG. 10 is a conceptual diagram illustrating a long short term memory (LSTM) cell of a recurrent neural network (RNN).
Figure 11:
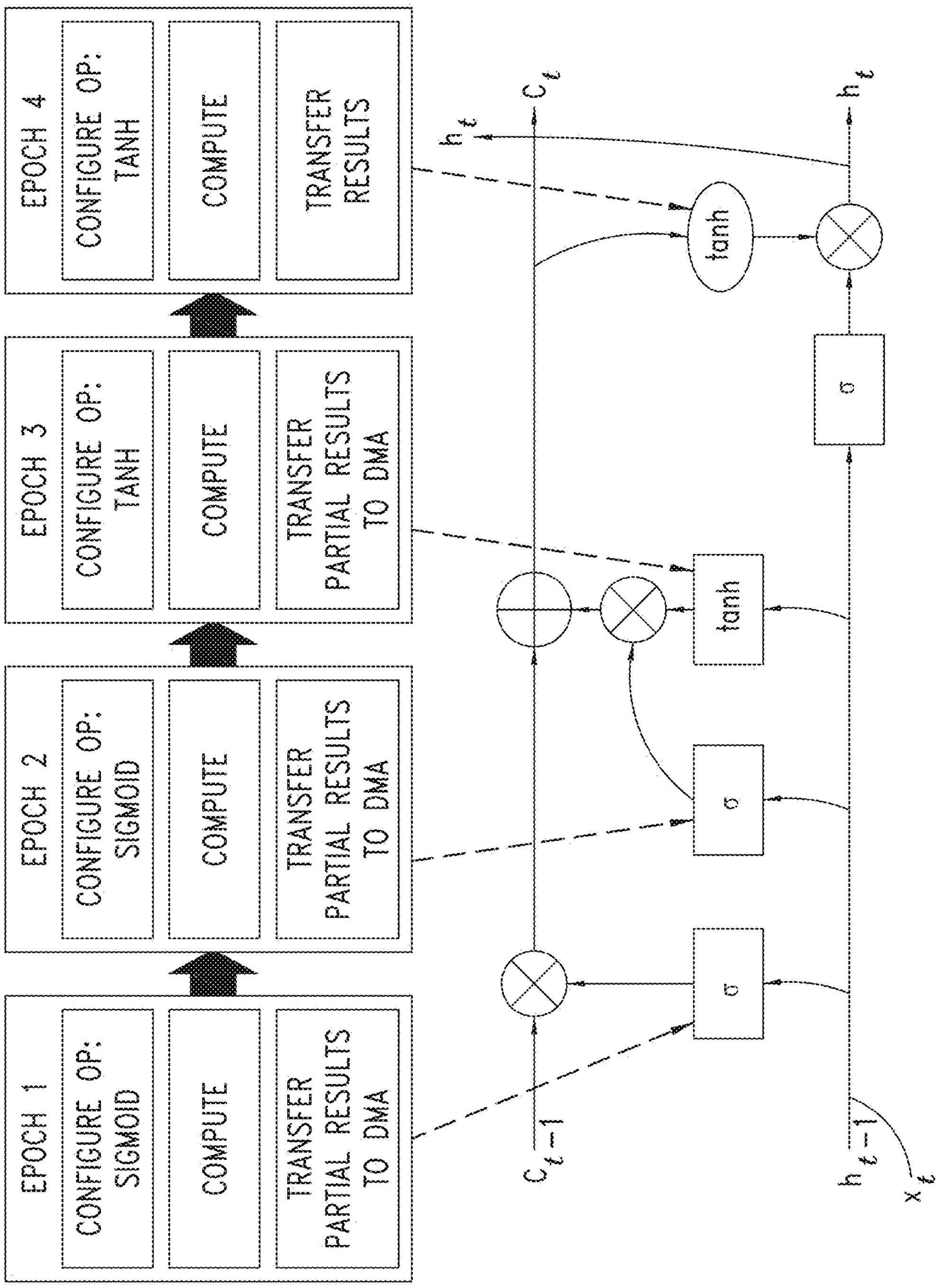
FIG. 11 is a conceptual diagram illustrating a sequence of programming of processing epochs to implement the activations of the LSTM cell of FIG. 10.

For example, FIG. 10 is a conceptual diagram illustrating a long short term memory cell (LSTM) often employed in recurrent neural networks (RNN), and FIG. 11 illustrates a sequence of programming of processing epochs to implement the activations of the LSTM cell. As can be seen, four programming epochs are typically employed to implement the LSTM cell.

Multiple reprogramming operations to implement separate processing epochs, however, may negatively impact the operation of the system in several ways. First, multiple reprogramming operations can have a significant impact on the total time needed to complete the processing. In the example of FIGS. 10 and 11, the use of four separate programming epochs is a significant factor in the time needed to implement the LSTM cell.

Second, in most cases intermediate data must be stored (e.g., in on-chip or external memory) between processing epochs. The storage and retrieval of intermediate data between each of multiple processing epochs may add significant costs in terms of delay, energy usage (power), and chip area for the associated memory. In addition, moving intermediate results out of an accelerator may be detrimental in terms of precision. For example, moving the data out of an accelerator may introduce truncation errors (e.g., due to size constraints of a bus used to transfer the data).

To facilitate reducing the number of processing epochs needed to implement multiple different types of operations to be performed on a same set of input data, context-based processing techniques may be employed. Reducing the number of processing epochs needed, in turn, facilitates reducing the total time needed to complete the processing, reducing the power consumption associated with the processing, reducing the number of memory transfers associated with the processing, reducing the chip area associated with memory transfers, and reducing the precision errors associated with memory transfers. Instead of using multiple processing epochs, context information can be provided to the hardware accelerator which indicates to the various components of the hardware accelerator (e.g., stream switch 112, convolutional accelerators 124, functional logic circuits 126, processing elements 128, etc.) the processing operations to be performed with respect to corresponding streamed data.

One way to provide context information to a hardware accelerator is to embed context information in the data stream. For example, tags indicative of a processing context can be embedded in the data stream. The tags indicate when to switch between different contexts. The various processing components of the hardware accelerator can read the embedded information (e.g., tags) and change the processing context in response. The embedded information (e.g., tags)

can indicate, for example, a virtual channel ID (VCID) associated with a corresponding data stream.

Figure 12:
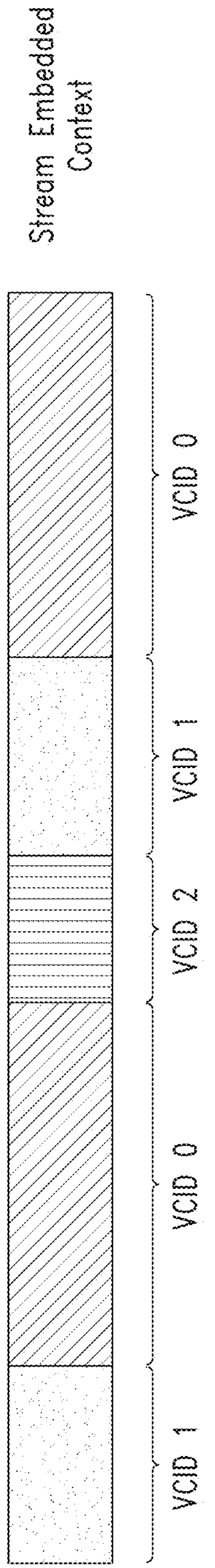
FIG. 12 is a conceptual diagram illustrating an example of using context information embedded in a data stream to implement context-based processing in a stream-based hardware accelerator.

FIG. 12 is a conceptual diagram illustrating the use of embedded tags indicative of a virtual channel ID in a data stream to provide processing context information to a hardware accelerator. One or more processing components read the tag in the data stream and based on the tag, determine how to process the corresponding streamed data. In the illustrated example, the data stream includes a first tag which indicates VCID 0, one or more processing components (e.g., a processing element 128) read the first tag and processing associated with VCID 0 is performed on the corresponding data by the processing component(s). The data stream subsequently includes a second tag which indicates VCID 1, one or more processing components read the second tag and change to performing processing associated with VCID 1 on the data corresponding to the second tag. The data stream subsequently includes a third tag which indicates VCID 2, one or more processing components read the third tag and change to performing processing associated with VCID 2 on the data corresponding to the third tag. The data stream subsequently includes a fourth tag which indicates VCID 0, one or more processing components read the fourth tag and resume performing processing associated with VCID 0 on the data corresponding to the fourth tag. The data stream subsequently includes a fifth tag which indicates VCID 1, one or more processing components read the fifth tag and resume performing processing associated with VCID 1 on the data corresponding to the second tag.

While the illustrated example is cyclical (e.g., a repeating cycle of tags indicating VCID 0, VCID 1, and VCID 2), tags indicating different VCIDs may be embedded in various orders and the length of the stream data corresponding to a tag may vary. The timing of the change in context and the change in processing can be based on when the tag is read from the data stream. Embedded tags can indicate other types of context information instead of or in addition to a VCID, and the number of different tags indicating different contexts may vary.

Another way to provide context information to a hardware accelerator is to use configured context-based processing. For example, the amount of valid data transactions received in a data stream can be counted, and the context changed in response to reaching threshold counts of received valid data transactions. The threshold counts and the associated context-based processing information can be stored in configuration registers, stored in memory and retrieved at run time (e.g., a linked list), etc., to determine the sequence of operations to be performed on streamed data as various threshold counts of received valid data transactions are reached. The sequence of operations can be configured in advance, with the timing of the sequence determined based on when the amounts of valid data elements received reach the threshold counts.

Figure 13:
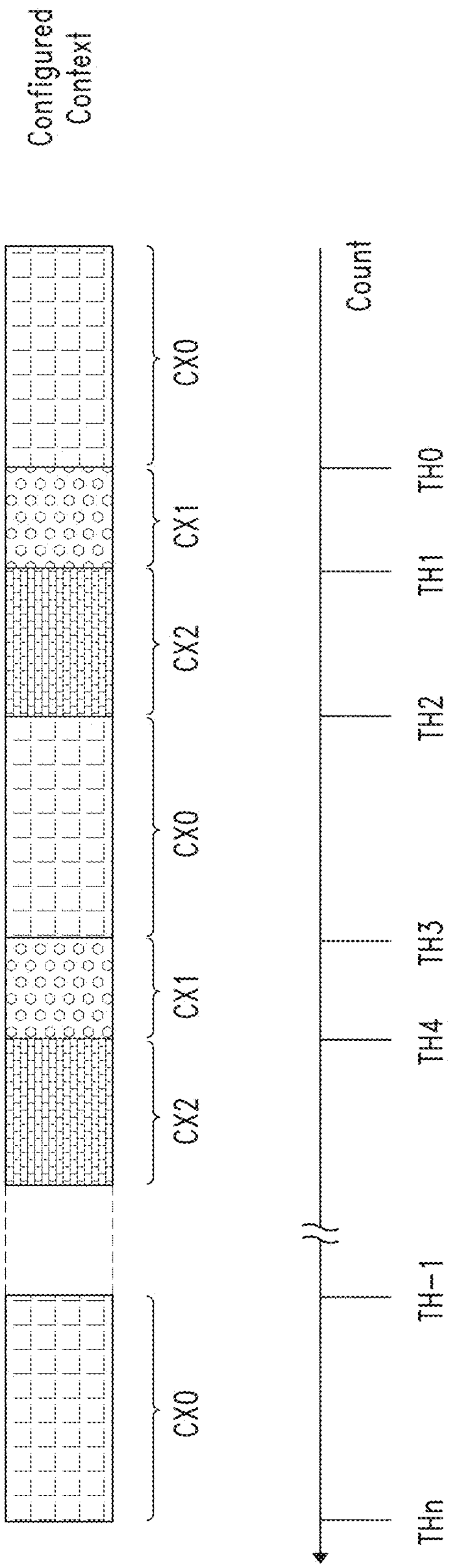
FIG. 13 is a conceptual diagram illustrating an example of using stored configuration context information to implement context-based processing in a stream-based hardware accelerator.

FIG. 13 is a conceptual diagram illustrating counting the amount of valid data transactions received in one or more data streams, and determining processing context information based on the counts reaching threshold counts. One or more processing components count the number of received valid valid data transactions in one or more data streams, and based on when the counts reach a sequence of thresholds, determine how to process the corresponding streamed data. The number of valid data transactions can be correlated to a number of data elements transferred through a stream link. In a simple example, each transaction may correspond to a single data element. However, there can be cases where multiple data elements are transferred during a transaction, and cases where a data element requires multiple transactions to be transferred.

In the illustrated example, until the number of received valid data transactions counted reaches a first threshold TH0, processing is performed in accordance with a first context CX0, based on when the count reaches the first threshold TH0, processing is changed to processing performed in accordance with a second context CX1. Based on when the count reaches a second threshold TH1, processing is changed to processing performed in accordance with a third context CX2. Based on when the count reaches a third threshold TH2, processing is changed to processing performed in accordance with the first context CX0. Based on when the count reaches a fourth threshold TH3, processing is changed to processing performed in accordance with the second context CX1. Based on when the count reaches a fifth threshold TH4, processing is changed to processing performed in accordance with the third context CX2, and so forth until the count reaches a Nth threshold THn.

While the illustrated example is cyclical (e.g., a repeating cycle of context changes in response to reaching a sequence of threshold counts), contexts may be changed in various orders and the relative values of the threshold counts may vary. The threshold counts can be absolute with respect to a beginning of a data stream (e.g., 16 elements from the element 0, 64 elements from element 0, etc.), can be reset when a threshold count is reached, various combinations thereof, etc. Nesting may be employed in configured context-based processing. For example, the processing context may switch between a first context and a second context a determined number of times as various threshold counts are reached.

Figure 14:
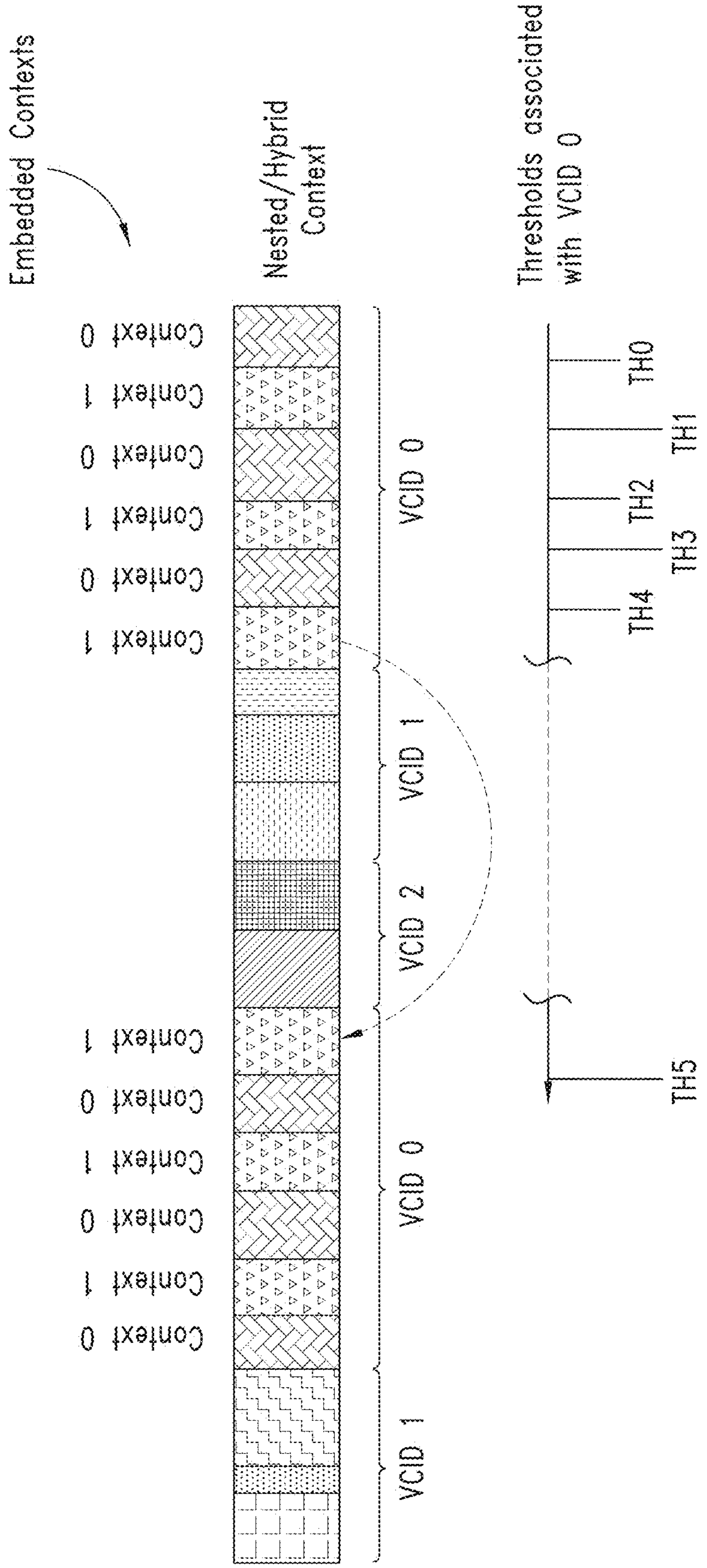
FIG. 14 is a conceptual diagram illustrating an example of using a nested/hybrid method of providing context information to implement context-based processing in a stream-based hardware accelerator.

Another way to provide context information to a hardware accelerator is to combine the use of stream embedded context-based processing with the use of configured context-based processing in a nested/hybrid context-based processing configuration. FIG. 14 is a conceptual diagram illustrating a nested/hybrid method of providing context information to a stream-based hardware accelerator. In the illustrated example, tags indicative of a virtual channel ID are embedded in a data stream to provide processing context information to a hardware accelerator using an embedded context approach, and the amount of valid data transactions received in the data stream associated with the respective virtual channel IDs are counted to provide additional processing context information to the hardware accelerator based on the counts reaching threshold counts.

In the illustrated example, the data stream includes a first tag which indicates VCID 0, one or more processing components (e.g., a processing element 128, a multi-context engine or circuit 150, discussed in more detail below, etc.) read the first tag, and until a first count threshold of transactions TH0 is reached, context processing associated with VCID 0 and with configured context 0 is performed on the corresponding data by the processing component(s). When a second count threshold of transactions TH1 is reached, processing associated with VCID 0 and configured context 1 is performed on the corresponding data. When a third count threshold of transactions TH2 is reached, processing associated with VCID 0 and configured context 0 is performed on the corresponding data. When a fourth count threshold of transactions TH3 is reached, processing associated with VCID 0 and configured context 0 is performed on the corresponding data. When a fifth count threshold of transactions TH4 is reached, processing associated with VCID 0 and configured context 1 is performed on the corresponding data until a second tag which indicates VCID 1 is read from the data stream.

In response to reading the second tag indicating VCID 1, processing associated with VCID 1 and a first configured context associated with VCID 1 is performed until a count threshold is reached indicating a second configured context associated with VCID 1 is to be employed, and so forth until a third tag which indicates VCID 2 is read from the data stream.

In response to reading the third tag indicating VCID 2, processing associated with VCID 2 and a first configured context associated with VCID 2 is performed until a count threshold is reached indicating a second configured context associated with VCID 2 is to be employed, and so forth until a fourth tag which indicates VCID 0 is read from the data stream.

It is noted that in some cases, the timing of tags embedded in the data stream may not align with the reaching of threshold transaction counts. In some implementations, in response to reading a tag from the data stream indicating a change from a context associated with a first virtual channel to a context associated with a second virtual channel, processing associated with a current context may be suspended and resumed in response to reading a subsequent tag indicating the context association with the first virtual channel. With reference to FIG. 14, when the second tag indicating VCID 1 is read from the data stream, the sixth threshold count TH5 for VCID 0 has not been reached. Context based processing of data associated with VCID 0 and context 1 is suspended in response to reading the second tag indicating VCID 1 from the data stream, and resumed in response to reading of the fourth tag indicating VCID 0. For example, a pending count may be resumed and processing associated with the first configured context may resume until the next threshold count (TH5) associated with VCID 0 is reached. The dashed arrow and dashed line in FIG. 14 illustrate the suspension and resumption of transaction counting and processing associated with VCID 0 and context 1. In other implementations, the count may be reset in response to reading a tag from the data stream indicating a change from a context associated with a first virtual channel to a context associated with a second virtual channel, instead of being suspended.

The illustrated example is representative. Embedded context information may indicate VCIDs in various orders and configured contexts may be changed in various orders, and the relative values of the threshold counts may vary. The threshold counts can be absolute with respect to a VCID associated with a data stream (e.g., 16 transactions from the transaction 0 in data associated with the VCID, 64 transactions from transaction 0 in data associated with the VCID, etc.), can be reset when a threshold count is reached, can be reset when an embedded tag is read from the data stream, and various combinations thereof, etc.

To facilitate the implementation of context-based processing by the system 100, the hardware accelerator 120 of FIG. 9 includes one or more multi-context engines or circuits 150 coupled between the stream switch 130 and various processing components of the hardware accelerator 120 (e.g., convolutional accelerators 124, functional logic circuits 126, processing elements 128). The multi-context engines, in operation, control implementation of multi-context processing by processing components of the hardware accelerator 120. For example, a multi-context engine 150 can control processing of a data stream by various processing components based on context information embedded in a data stream, based on configured context-based processing (e.g., based on threshold amounts of data), or based on combinations of context information embedded in a data stream and configured context information, such as discussed herein.

Embodiments of the system 100 of FIG. 9 may include more components than illustrated, may include fewer components than illustrated, may combine components, may separate components into sub-components, and various combination thereof. For example, the configuration registers 138 may be combined with the arbitration logic 140, integrated into the output ports 136, etc. In another example, a multi-context engine 150 may be coupled to multiple processing components (e.g., to a plurality of convolutional accelerators 124, to a convolutional accelerator 124 and a functional logic circuit 126, etc.).

Figure 15A:
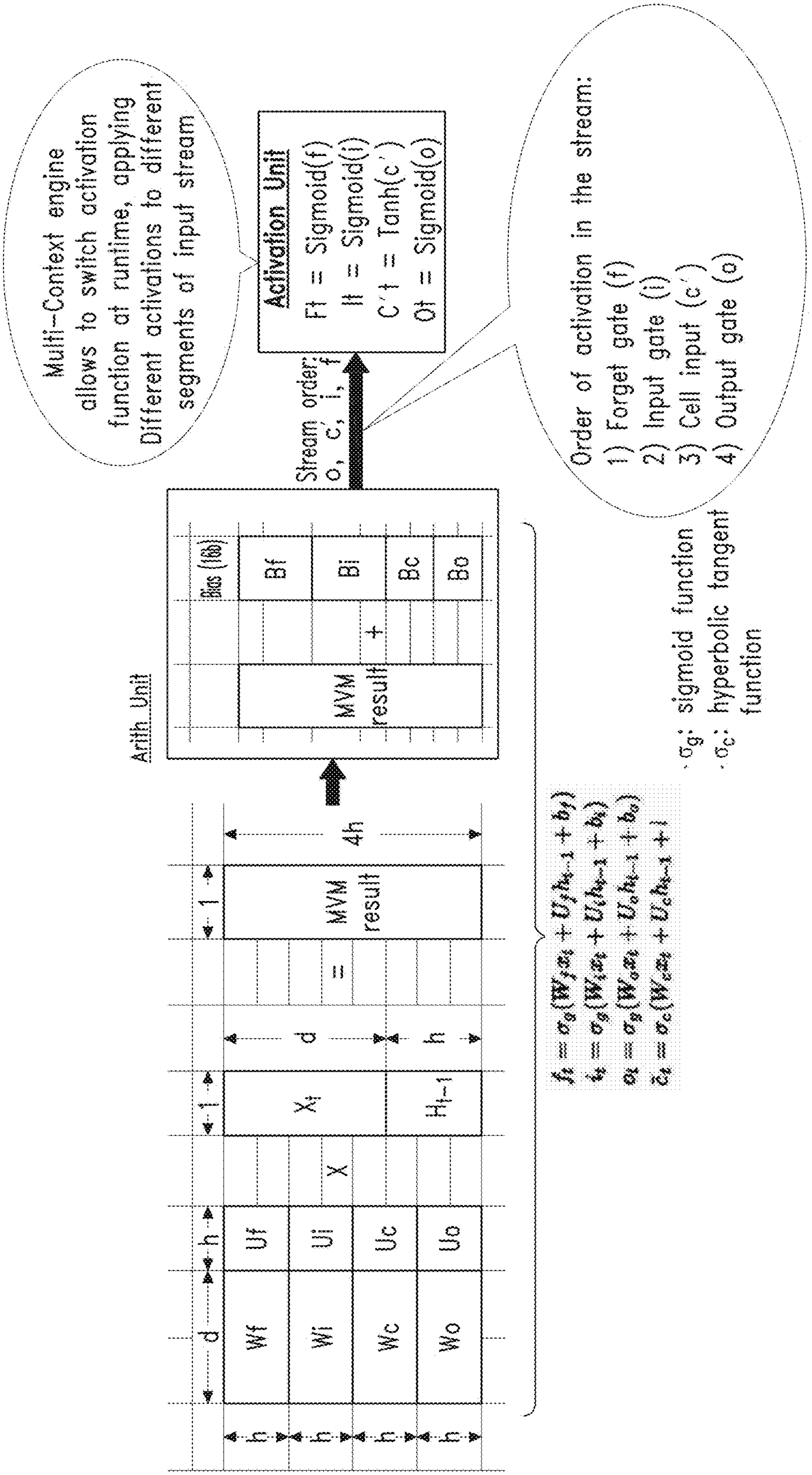
FIGS. 15A and 15B are conceptual diagrams illustrating examples of using stored configuration context information to program a stream-based hardware accelerator to implement an LSTM cell in a single programming epoch.
Figure 15B:
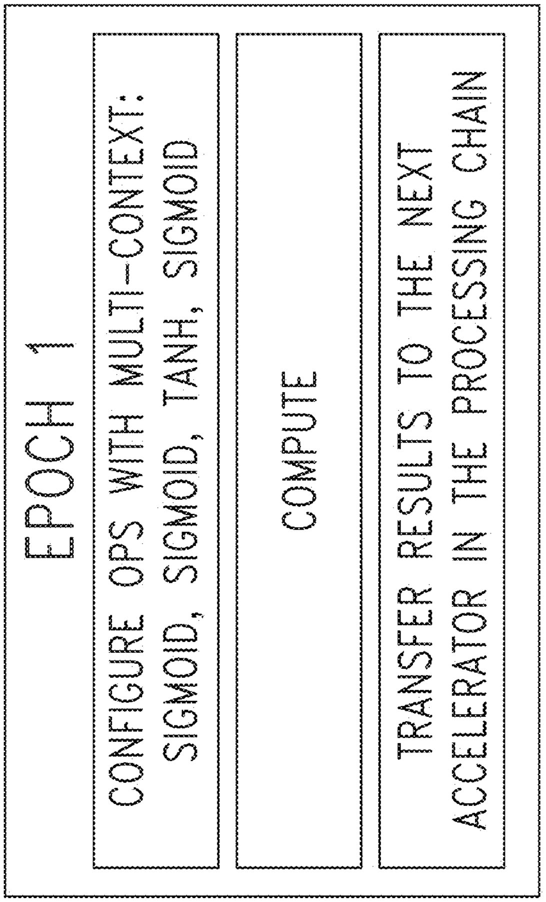

FIGS. 15A and 15B are conceptual diagrams illustrating using configured context-based processing to program a stream-based hardware accelerator to implement an LSTM cell in a single epoch, such as the LSTM cell of FIG. 10. Different activation functions are applied at runtime to different segments of the input data stream to program a stream-based hardware accelerator to implement the LSTM.

Figure 17:
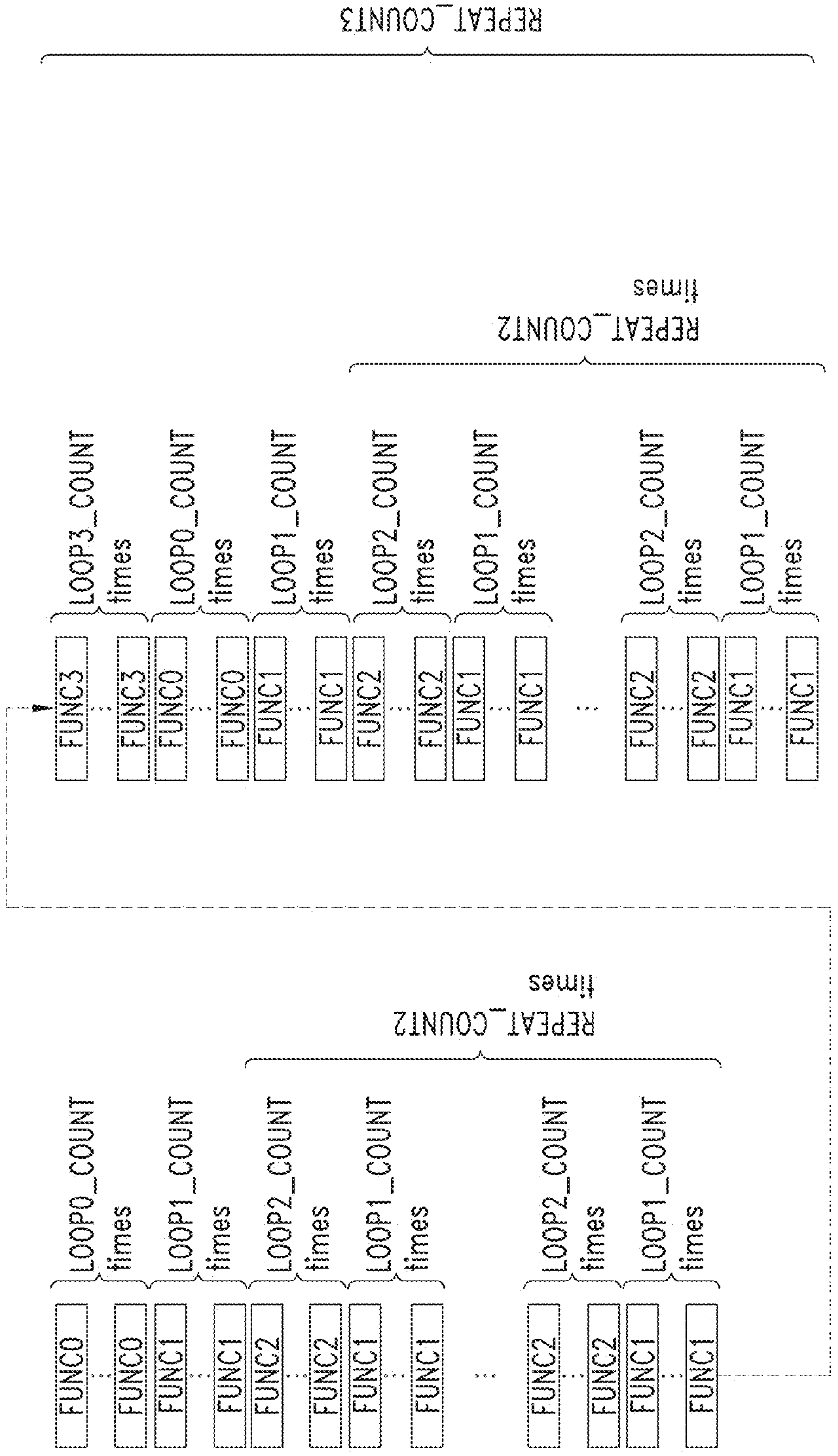

FIGS. 16 and 17 are conceptual diagrams illustrating an example of using C-code to implement configured context-based processing. Four different functions are implemented in the example of FIGS. 16 and 17: func0, func1, func2, and func3. First, func0 is performed for a count of LOOP0_COUNT. Then, func1 is performed for a count of LOOP1_COUNT. A nested loop is then implemented, repeating a cycle of func2 followed by a cycle of func1. For a repeat count of REPEAT_COUNT2, func2 is performed LOOP2_COUNT times, followed by func1 for LOOP1_COUNT times in a loop. Finally, a more complex nested loop is repeated REPEAT_COUNT3 times, which includes a nested loop repeated REPEAT_COUNT2 times.

Figure 18:
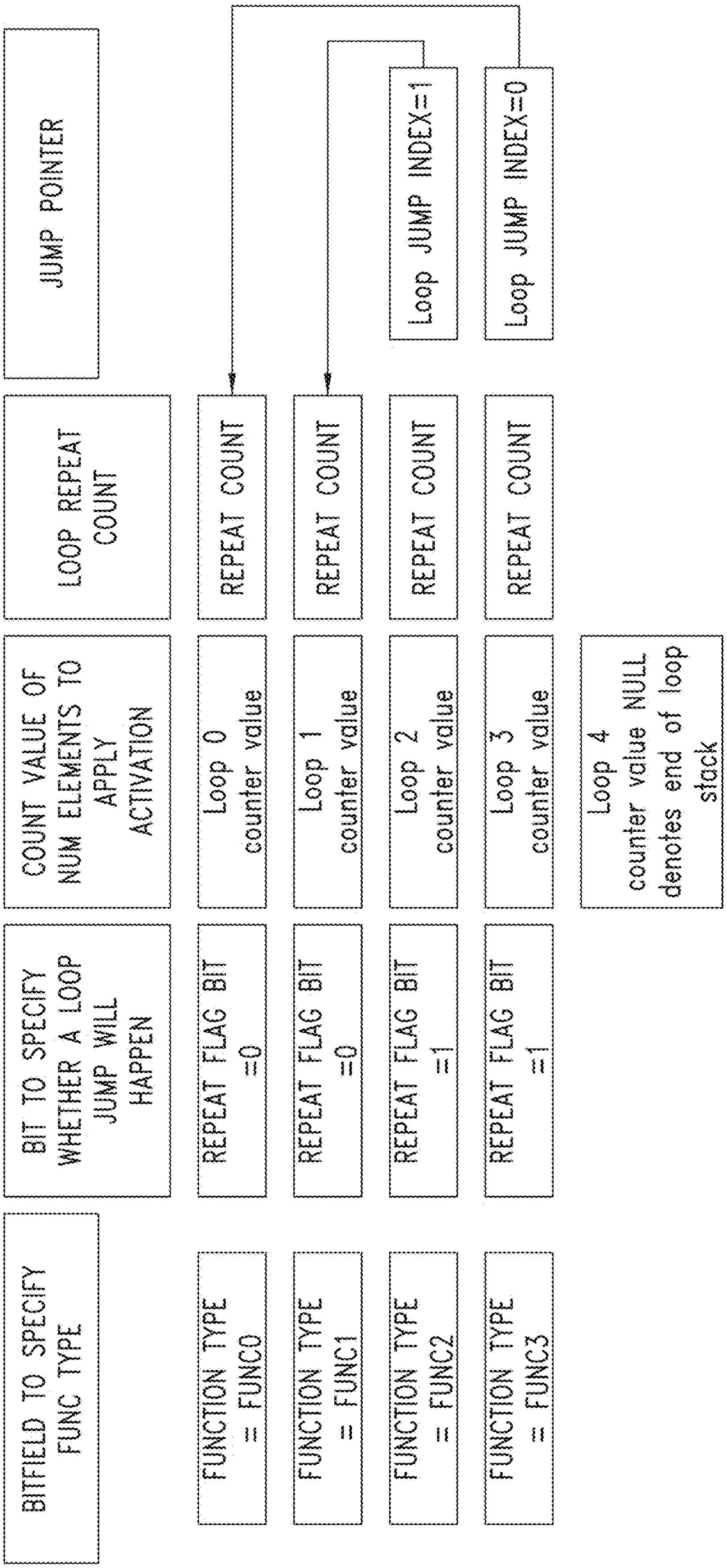

FIGS. 18 and 19 are conceptual diagrams illustrating example configured context-based processing information that may be stored or retrieved by a hardware accelerator supporting a multi-context engine environment (see hardware accelerator 120 of FIG. 9) to implement the configured context-based processing of the example of FIGS. 16 and 17. The TYPE field or bit indicates a function to be applied to the data in a configured context. The COUNT field indicates a number of values to be processed before switching to another context. The REPEAT_FLAG field indicates whether a context is part of a loop which is repeated. The JUMP_POINTER field indicates a next context in a loop when the REPEAT_FLAG is set, and the REPEAT_COUNT field indicates a number of times to repeat a loop including multiple contexts. The configured context-based processing information may be stored in configuration registers of a hardware accelerator, stored in a linked list and retrieved at run time, (e.g., when configuration register space is limited), etc., and various combinations thereof.

Figure 20:
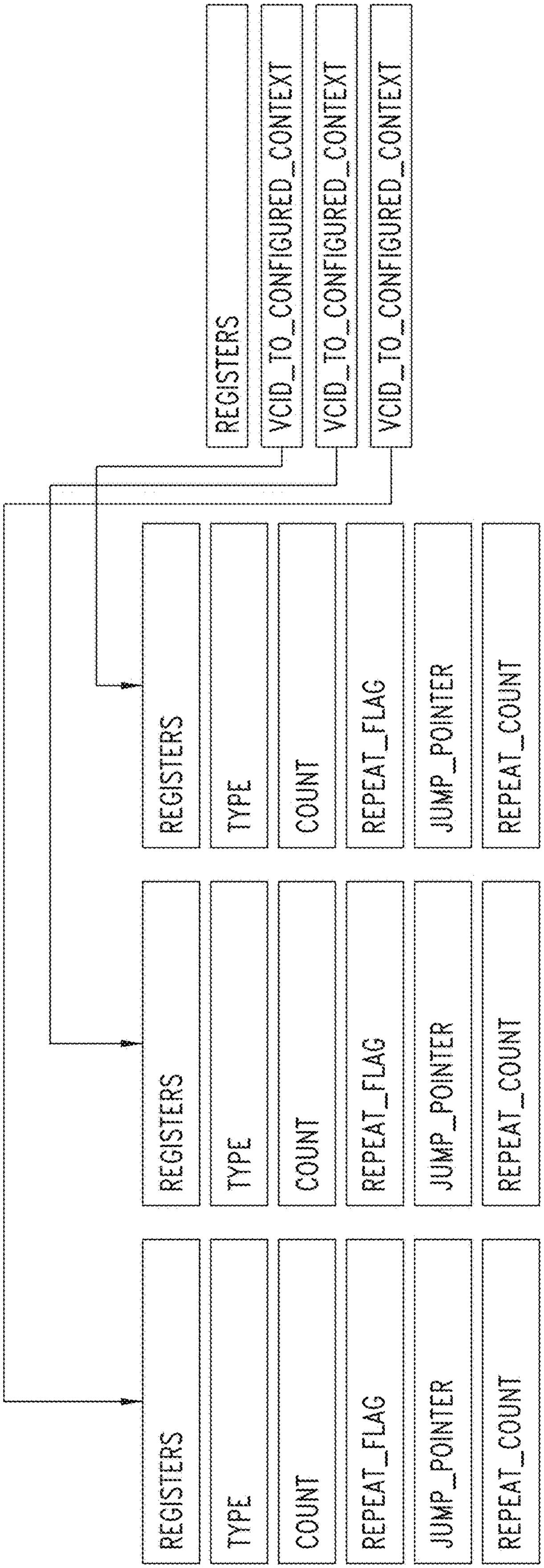
FIG. 20 is a conceptual diagram illustrating example context-based processing information that may be stored or retrieved by a stream-based hardware accelerator to implement hybrid/nested context-based processing.

FIG. 20 is a conceptual diagram illustrating example context-based processing information that may be stored or retrieved by a hardware accelerator supporting a multi-context engine environment (see hardware accelerator 120 of FIG. 9) to implement the hybrid/nested context-based processing. For each embedded context supported (e.g., the number of virtual channels supported), configured-context information associated with the context is stored, such as TYPE field information, COUNT field information, REPEAT_FLAG field information, JUMP_POINTERs, and REPEAT_COUNTs. An additional set of registers can be employed to store information associating each embedded context supported (e.g., each virtual channel ID) with corresponding configured context-based information. The configured context-based processing information can be stored in sets of configuration registers of a hardware accelerator, stored in a linked list and retrieved at run time, etc., and various combinations thereof.

Figure 21:
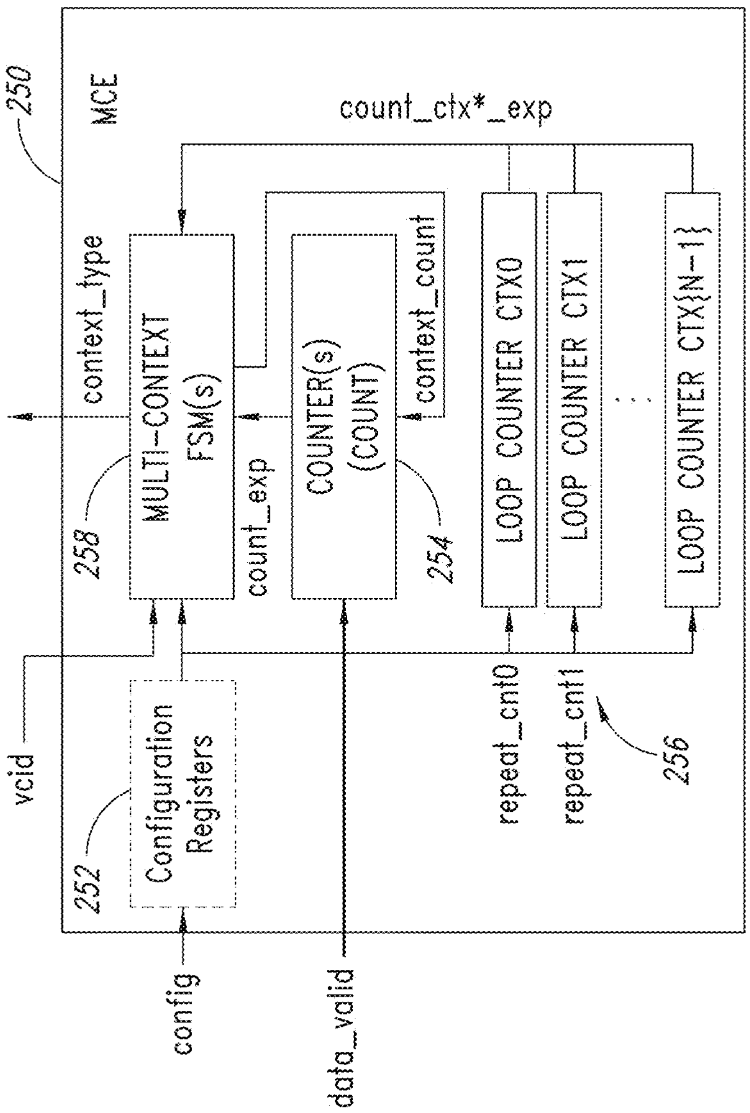
FIG. 21 is a functional block diagram illustrating a multi-context engine or circuit according to an embodiment.

FIG. 21 is a functional block diagram illustrating an example multi-context engine (MCE) or circuit 250 according to an embodiment. The MCE 250 of FIG. 21 may be employed, for example, as the MCE 150 of FIG. 9. As illustrated, the MCE 250 includes one or more sets of configuration registers 252, one or more valid data counters 254, one or more loop counters 256, and one or more multi-context finite state machines (FSM) 258.

The one or more sets of configuration registers 252 store configuration information used to implement context-based processing in a stream-based hardware accelerator, such as the configured-context information described above with reference to FIGS. 18-20. While illustrated as part of the MCE 250, the configuration registers 252 can be separate from the MCE 250 or distributed in a hardware accelerator (e.g., with reference to FIG. 9, a separate component of the hardware accelerator 120, located in the stream switch 130, located in a convolutional accelerator 124, located in a functional logic circuit 126, located in a processing element 128, etc., and various combinations thereof).

The one or more valid data counters 254 count valid data as the data is received in a data stream. To implement configured context-based processing, a single valid data counter 254 can be sufficient. Using multiple valid data counters 254 facilitates implementing nested/hybrid context-based processing. For example, each supported embedded context (e.g., each virtual channel) can be associated with a respective data counter 254 of a plurality of data counters. This facilitates suspending/resuming a configured context associated with an embedded context when a tag in the data stream indicates a switch to a different embedded context.

For example, a first configured context associated with a first virtual channel ID may not be complete (the full count may not have been reached) when a tag indicating a switch to a context associated with a second virtual channel ID is received in a data stream. Instead of resetting a single counter 254 to count valid data associated with the second virtual channel ID, a first counter 254 counting valid data associated with the first virtual channel ID can suspend counting until another tag indicating a switch back to the context associated with the first virtual channel ID is received, and at that point the first counter can resume counting until the resumed context is complete. In the interim, a second counter 254 associated with the second virtual channel ID counts valid data received which is associated with the second virtual channel ID.

The one or more loop data counters 256 can count the number of times the valid data counters 254 reach associated threshold transaction counts as the data is received and processed in loops as part of a configured context. For example, a signal can be generated by a FSM 258 when a threshold transaction count is reached by a data counter 254, logic can be applied to an output of a data counter 254, etc. Using multiple loop data counters 256 facilitates implementing nested context-based processing and nested/hybrid context-based processing.

The one or more multi-context FSMs 258 determine based on the embedded context information, the stored configured context information, the counting by the valid data counters and by the loop counters, a context type to be applied by one or more processing components of a programmable hardware accelerator to the associated data in a data stream. For example, with reference to FIG. 9, a context type to be applied by a convolutional accelerator 124, a functional logic circuit 126, a processing element 128, etc., of a programmable hardware accelerator 120 is determined by a FSM of the one or more FSMs 258.

To implement configured context-based processing, a single FSM 258 can be sufficient. Using multiple FSMs 258 facilitates implementing nested/hybrid context-based processing. For example, each supported embedded context (e.g., each virtual channel) can be associated with a respective FSM of a plurality of FSMs 258.

Embodiments of the MCE 250 of FIG. 21 may include more components than illustrated, may include fewer components that illustrated, may combine components or split components in various manners, may transmit additional signals, etc., and various combinations thereof. For example, as discussed below with reference to FIG. 22, the MCE 250 may include arbitration logic to arbitrate between the context selections by FSMs of the plurality of FSMs 258.

Figure 22:
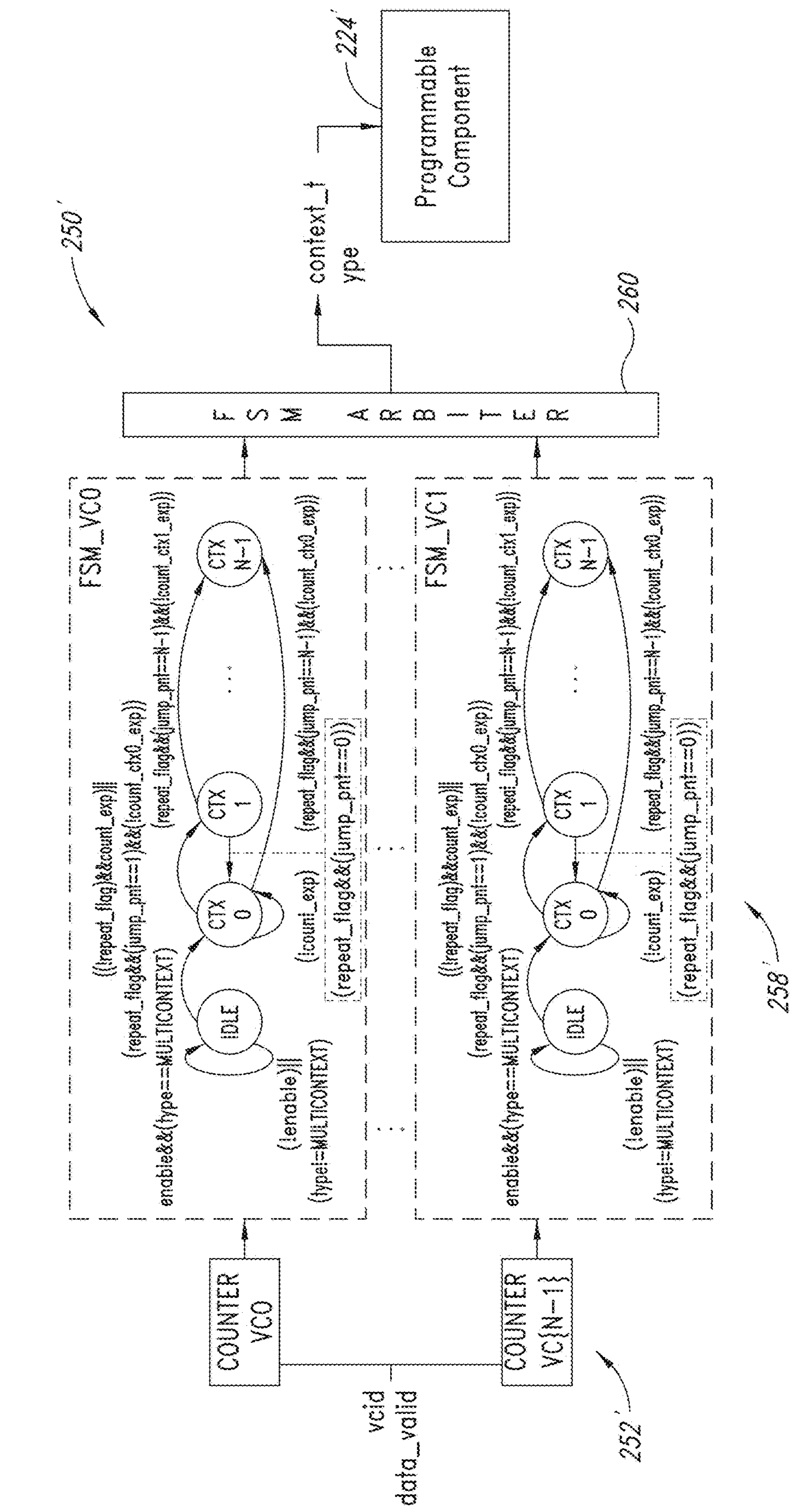
FIG. 22 is conceptual diagram illustrating the use of finite state machines (FSMs) by a multi-context engine or circuit to provide hybrid/nested context control to a programmable component according to an embodiment.

FIG. 22 is conceptual diagram illustrating the use of multiple FSMs to generate a context type. A MCE 250' provides a context type to a processing element of of a hardware accelerator, as illustrated, providing a context type to a programmable component 224', such as a convolutional accelerator 124 of FIG. 9. The MCE 250' includes a plurality of valid data counters 252', one for each of a plurality of supported embedded contexts, as illustrated, one valid data counter 252' for each of a plurality of supported virtual data channels. In operation, the valid data counters 252' count valid data associated with a corresponding virtual channel ID.

The MCE 250' includes a plurality of FSMs 258', one for each of a plurality of supported embedded contexts, as illustrated, one FSM 258' for each of a plurality of supported virtual data channels. In operation, the FSMs 258' determine a hybrid/nested context type to be applied by a programmable component based on the respective valid data transaction counts associated with a corresponding virtual channel ID, and in some implementations, loop counter values.

The MCE 250' of FIG. 22 includes FSM arbitration logic 260, which arbitrates between the context types determined by the plurality of FSMs 258'. For example, the arbitration logic 260 determines to provide a context type determined by an FSM 258 of the plurality of FSMs 258 which is associated with a current active embedded context, as illustrated, a current active virtual channel ID. For ease of illustration, in FIG. 22 loop counters (see loop counters 256 of FIG. 21) are omitted, and the illustrated state transitions are simplified illustrations of example transitions (e.g., transitions to the idle state are omitted).

Figure 23:
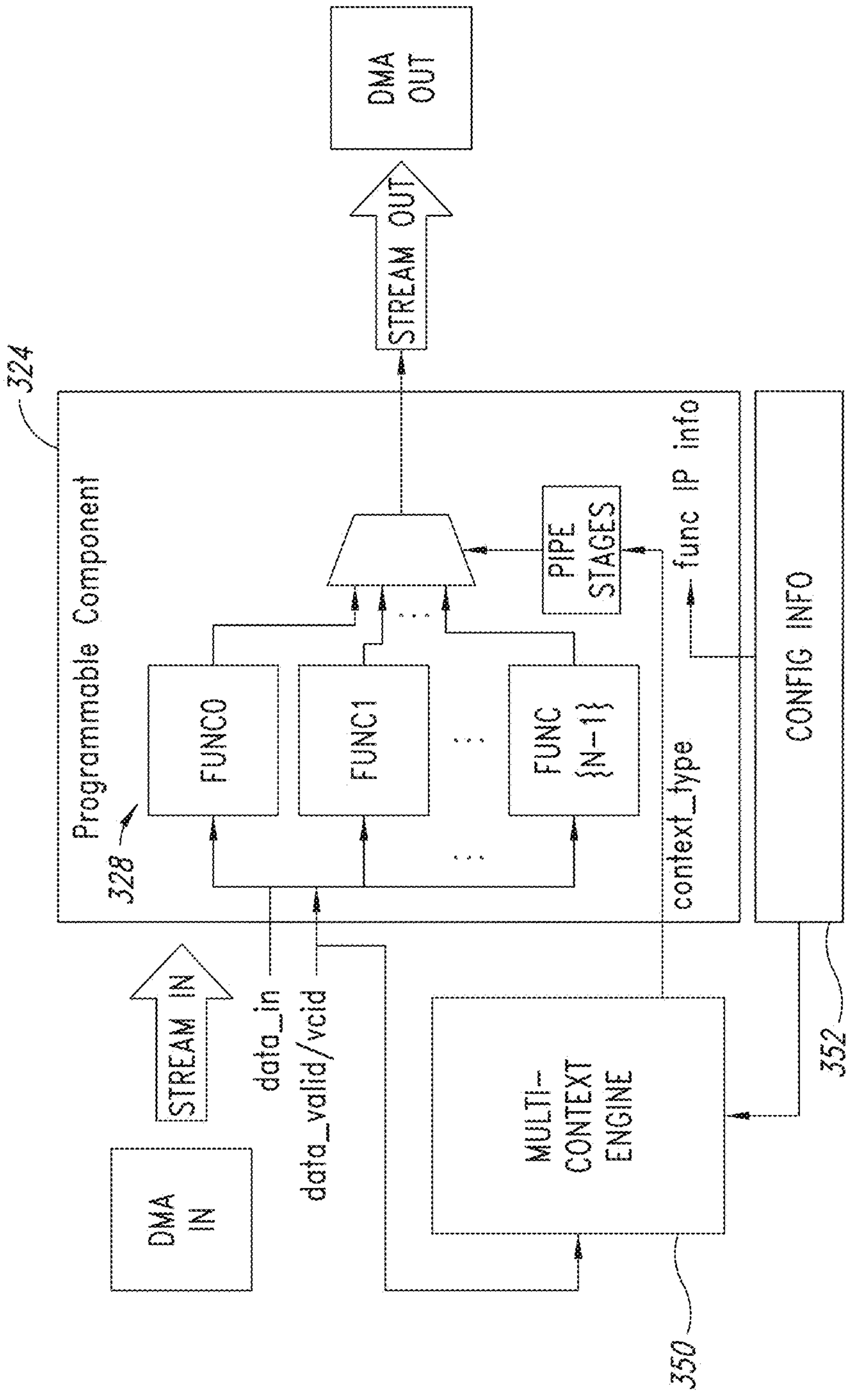
FIG. 23 is a functional block diagram illustrating a multi-context engine or circuit providing context control to a programmable component according to an embodiment.

FIG. 23 is conceptual diagram illustrating the use of a MCE 350 to control an operational context of a programmable component 324 of a programmable hardware accelerator. An incoming data stream DMA IN is provided to the programmable component and to the MCE 350. The data stream includes data to be processed and embedded context information, as illustrated, a data valid indicator and a virtual channel ID associated with the valid data. The MCE 350 uses the embedded context information, counts of the received valid data, and stored configured context information 352 to determine a context type to apply to the valid data transactions of the incoming data stream. The programmable component 324 uses the context type provided by the MCE 350 to determine which function or functions of FUNC 0 to FUNC{N-1} to apply to the data to be processed, as illustrated, by one of the processing elements 328, and may also retrieve stored configuration information to configure the applied function(s). Data processed in accordance with the context type is provided as an output stream DMA OUT by the programmable component 324. For example, a data path in the programmable component 324 may be determined based on the context type. It is noted that programmable component 324 may use the context type provided by the MCE 350 to control other functions, for example, to provide power control in addition to determining the processing context to be applied to the incoming data stream DMA IN. For example, circuitry, such as one or more processing elements 328, which is not needed to provide the determined processing context may be powered down, and circuitry which is needed to provide the determined processing context may be powered up based on the context type determined by the MCE 350.

Figure 24:
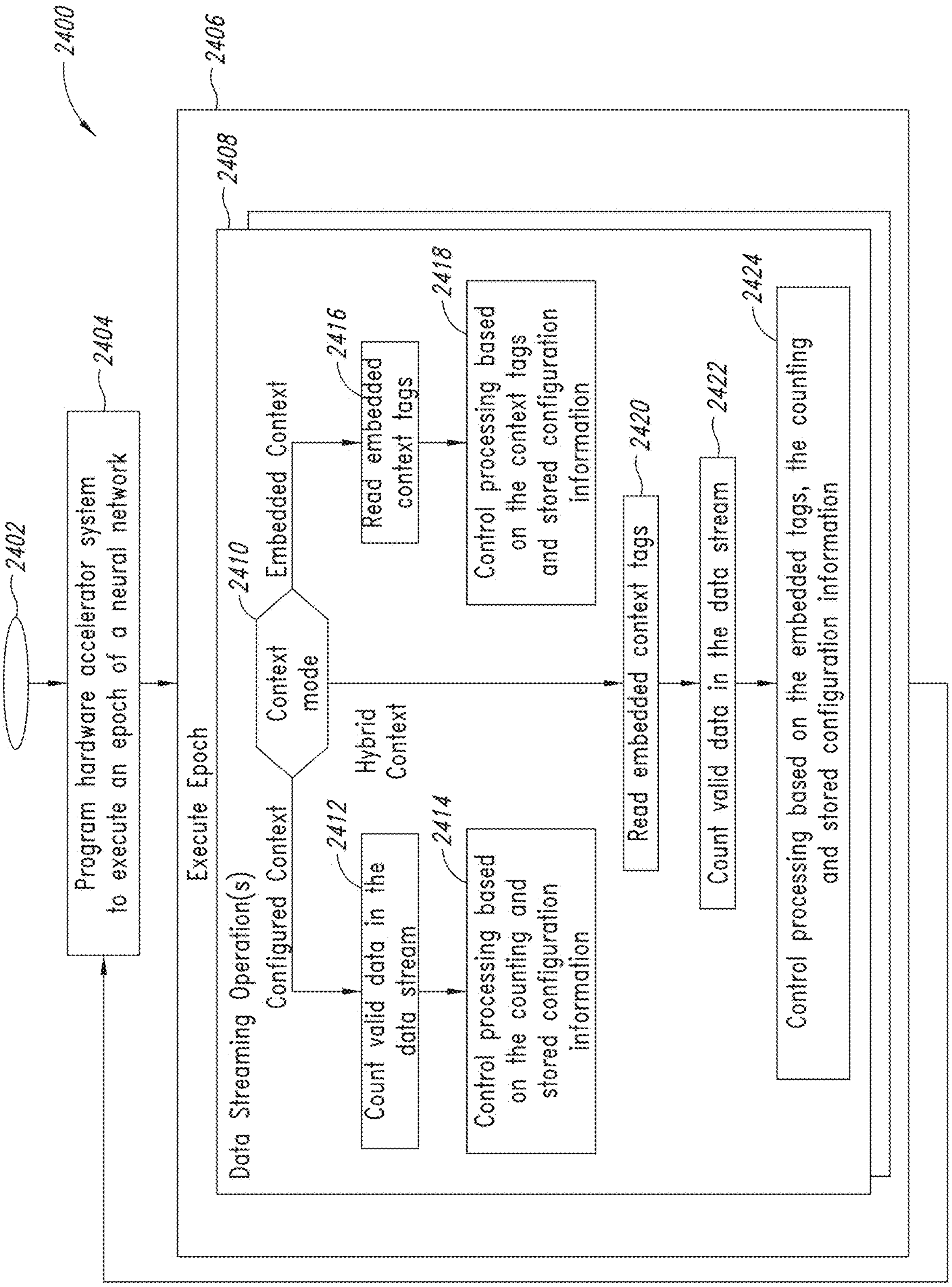
FIG. 24 is a flow chart illustrating an embodiment of a method of programming and controlling a programmable accelerator.

FIG. 24 illustrates an embodiment of a method 2400 of programming and controlling a programmable accelerator, such as the hardware accelerator 120 of FIG. 9. For convenience, FIG. 24 will be described with reference to FIGS. 9-23.

The method 2400 can be called, for example, by a host processor executing a neural network using one or more programmable hardware accelerators. At 2402, the method 2400 starts, and proceeds to 2404. At 2404, the method 2400 programs a hardware accelerator system to perform processing tasks, including data streaming tasks, associated with a processing epoch of a neural network. This can be done, for example, by a host processor 102 of FIG. 9 storing configuration information in one or more configuration registers, such as configuration information discussed above with respect to FIGS. 12-20 (e.g., configured context configuration information, embedded context configuration information, etc., combinations thereof). The method 2400 proceeds fro 2404 to 2406.

At 2406, the method 2400 executes the epoch, which includes performing processing tasks associated with the epoch using the hardware accelerator system programmed at 2404. The processing tasks typically include a plurality of data streaming operations 2408, which can be performed in parallel, in series, interactively, and various combinations thereof.

As illustrated, performing a data streaming operation at 2408 begins at 2410, where the method 2400 determines a context mode of operation associated with the data streaming operation. This can be done based on configuration information stored at settings associated with the data streaming operation.

When it is determined at 2410 that the context mode of operation is a configured context mode of operation, the method 2400 proceeds from 2410 to 2412, where the method counts valid data in the data stream, for example to determine when threshold counts of valid data in the data stream are reached. The method 2400 proceeds from 2412 to 2414, where a processing context to be applied to the data stream is controlled based on the counting and on stored configuration information. For example, a current count can be compared to one or more thresholds and a sequence of processing contexts determined based on the comparison and stored configuration information. The determined processing context can be used to determine processing operations or functions to be applied to the data. For ease of illustration, FIG. 24 illustrates acts 2412 and 2414 as sequential acts. Acts 2412 and 2414 may be performed in parallel, and may continue to be performed, for example, until processing of an epoch is complete.

When it is determined at 2410 that the context mode of operation is an embedded context mode of operation, the method 2400 proceeds from 2410 to 2416, where the method reads context tags embedded in the data stream, for example to determine a virtual channel ID associated with corresponding data in the data stream. The method 2400 proceeds from 2416 to 2418, where a processing context to be applied to the data stream is controlled based on the context tags embedded in the data stream and on stored configuration information. The determined processing context can be used to determine processing operations or functions to be applied to the data. For ease of illustration, FIG. 24 illustrates acts 2416 and 2418 as sequential acts. Acts 2416 and 2418 may be performed in parallel, and may continue to be performed, for example, until processing of an epoch is complete.

When it is determined at 2410 that the context mode of operation is a hybrid context mode of operation, the method 2400 proceeds from 2410 to 2420, where the method reads context tags embedded in the data stream, for example to determine a virtual channel ID associated with corresponding data in the data stream. The method 2400 proceeds from 2420 to 2422, where the method counts valid data in the data stream, for example to determine when threshold counts of valid data in the data stream are reached. The method 2400 proceeds from 2422 to 2424, where a processing context to be applied to the data stream is controlled based on the context tags embedded in the data stream, the counting, and on stored configuration information. The determined processing context can be used to determine processing operations or functions to be applied to the data. For ease of illustration, FIG. 24 illustrates acts 2420, 2422 and 2424 as sequential acts. Acts 2420, 2422 and 2424 may be performed in parallel, and may continue to be performed, for example, until processing of an epoch is complete.

After the execution of the epoch at 2406 is completed, the process 2400 returns to 2404 to program the hardware accelerator system to execute a subsequent epoch of the neural network.

Embodiments of the foregoing processes and methods may contain additional acts not shown in FIG. 24, may not contain all of the acts shown in FIG. 24, may perform acts shown in FIG. 24 in various orders, may combine acts, may split acts into separate acts, may perform acts in parallel or sequentially, and may be otherwise modified in various respects. For example, FIG. 24 can be modified to omit determining a context mode at 2410 when a programmable component of the programmable hardware accelerator is configured to perform in a single context mode, when the context mode can be inferred from the stored configuration information, etc. In another example, FIG. 24 can be modified to include a check as to whether there are additional epochs in the neural network to be programmed and executed before returning to 2404 from 2406. In another example, acts 2412 and 2414 can be combined in some embodiments, acts 2416 and 2418 can be combined in some embodiments, acts 2420, 2422 and 2424 can be combined in some embodiments.

As noted above, the described context-based processing techniques facilitate reducing the number of processing epochs needed to implement multiple different types of operations to be performed on a same set of input data. Reducing the number of processing epochs needed, in turn, facilitates reducing the total time needed to complete the processing, reducing the power consumption associated with the processing, reducing the number of memory transfers associated with the processing, reducing the chip area associated with memory transfers, and reducing the precision errors associated with memory transfers. Instead of using multiple processing epochs, context information can be provided to the hardware accelerator which indicates to the various components of the hardware accelerator (e.g., stream switch 112, convolutional accelerators 124, functional logic circuits 126, processing elements 128, etc.) the processing operations to be performed with respect to corresponding streamed data.

Stream-based hardware accelerators typically include a collection of fixed function programmable components, such as the one or more convolutional accelerators 124, one or more functional logic circuits 126, and one or more processing elements 128 of the hardware accelerator 120 of FIG. 9. The fixed function components can support most of the common operations performed in deep learning applications, and typically do so in an efficient manner.

As the number of deep learning operators, preprocessing operations, and postprocessing operations tends to increase, however, it can be difficult to scale a hardware accelerator employing fixed function programmable components to support acceleration of every common operator and operation. For example, adding fixed function components to support all of the new operations and operators can significantly increase the area and power requirements of a stream-based hardware accelerator.

One way to add flexibility to support an ever-growing number of operators and operations would be to add a general purpose CPU supporting vector processing and single instruction multiple data (SIMD) execution and multithreading capability to a stream-based hardware accelerator. A general purpose CPU, however, is not compatible with a stream-based model of computation. For example, there is no support in a general purpose CPU for interfacing with streaming data transported on streaming links via stream switches using flow control features. A general purpose CPU also is difficult to adapt to specialized memory interfaces and configurations (e.g., multi-ported memories, such as a scratchpad memory, in-memory compute memory arrays, etc.). General purpose CPUs also have limited event-driven multithreading support. In addition, a general purpose CPU typically has to support features which may not be necessary for deep learning applications, such as a large instruction set architecture, branch prediction logic, etc., all of which can impose significant area and power requirements.

Figure 25:
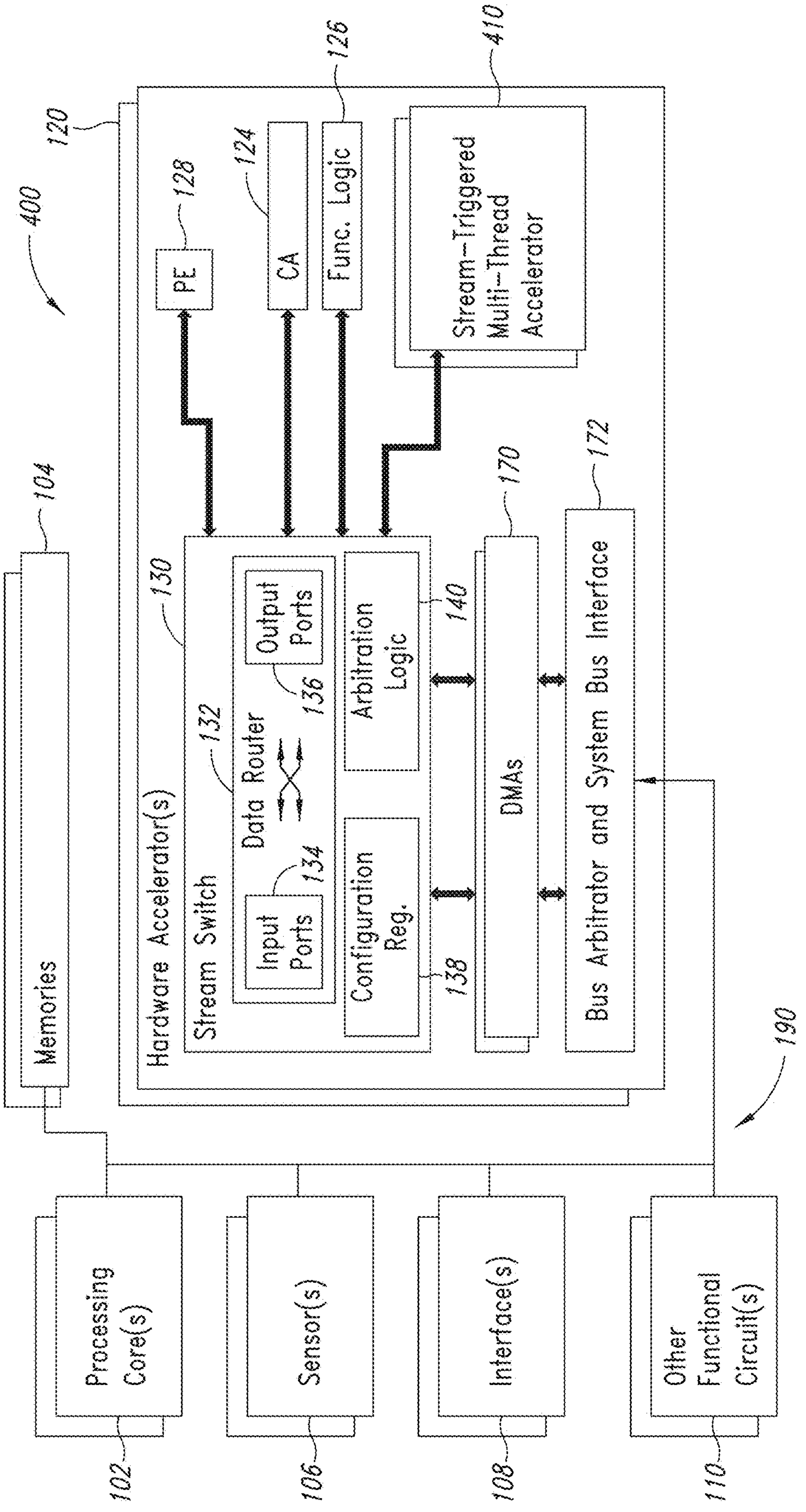
FIG. 25 is a functional block diagram of an electronic device or system employing a stream-triggered multi-thread accelerator according to an embodiment.

FIG. 25 is a functional block diagram of an embodiment of an electronic device or system 400 of the type to which described embodiments may apply. The system 400 of FIG. 25 is similar to the system 100 of FIG. 9, and the descriptions of elements of FIG. 9 having the same references numbers is incorporated herein by reference. To facilitate providing SIMD and multi-threading capabilities in a stream-based hardware accelerator, the system 400 of FIG. 25 includes one or more stream-triggered multi-thread (STMT) accelerators 410 coupled to the stream switch 130.

Figure 26:
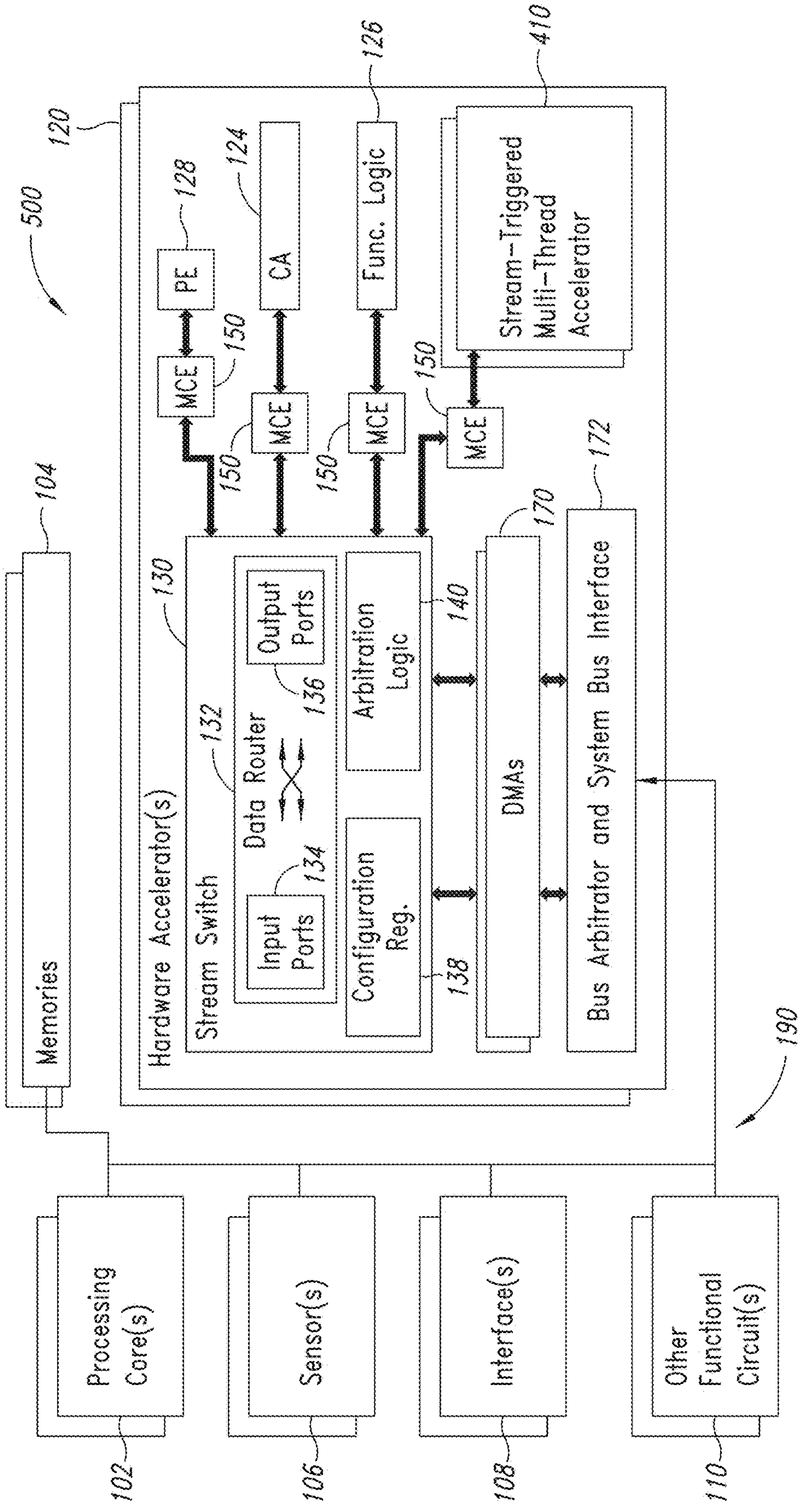
FIG. 26 is a functional block diagram of an electronic device or system employing a stream-triggered multi-thread accelerator according to another embodiment.

FIG. 26 is a functional block diagram of another embodiment of an electronic device or system 500 of the type to which described embodiments may apply. The system 500 of FIG. 26 is similar to the system 100 of FIG. 9, and the descriptions of elements of FIG. 9 having the same references numbers is incorporated herein by reference. As compared to the system 400 of FIG. 25, the STMT accelerators 410 of FIG. 26 are coupled to the stream switch 130 and to an MCE 150.

In some embodiments, a STMT accelerator 410 can be coupled to a system bus interface 172, instead of, or in addition to, being coupled to the stream switch 130. As discussed in more detail below, the STMT accelerators 410 facilitate flexibly providing additional functionality in a stream-based hardware accelerator environment. A STMT accelerator 410 can also be employed in context-based processing environments, as illustrated in FIG. 26.

To the stream switch 130, the DMA engines 170, the MCEs 150, other accelerators (e.g., convolutional accelerators 124), etc., the STMT accelerators 410 can be viewed as just another processing component of the hardware accelerator 120 to and from which data may be streamed, and to which context information may be provided to control a sequence of processing operation. In other words, data may be streamed to and from the STMT accelerators 410 in the same manner in which it is streamed to and from the other processing components of the hardware accelerator 120, such as convolutional accelerators 124, functional logic 126, and processing elements 128. This facilitates integrating the STMT accelerators 410 into a streaming data flow model of computation.

Embodiments of the system 400 of FIG. 25 and the system 500 of FIG. 26 may include more components than illustrated, may include fewer components than illustrated, may combine components, may separate components into sub-components, and various combination thereof. For example, various intellectual properties (IPs) of the hardware accelerator (e.g., the convolutional accelerators 124) may include dedicated control registers to store control information, line buffers and kernel buffers may be included in the hardware accelerator 120 to buffer feature line data and kernel data provided to the convolutional accelerators 124, etc., and various combinations thereof. In another example, cryptographic circuitry may be included in the bus arbitrator and system bus interface 172 to facilitate streaming of confidential data streams, etc. In another example, a multi-context engine 150 may be coupled to multiple processing components (e.g., to a plurality of convolutional accelerators 124, to a convolutional accelerator 124 and a functional logic circuit 126, etc.). In another example, the stream switch 130 may implement all or some of the functionality of an MCE 150. For example, the stream switch 130 may be configured to read embedded tags indicative of a VCID, and provide VCID context information to a processing element (e.g., a convolutional accelerator 124, a functional logic circuit 126, a processing element 128, a stream-triggered multi-thread accelerator 410, etc.). Similarly, a processing element (e.g., a convolutional accelerator 124, a functional logic circuit 126, a processing element 128, a stream-triggered multi-thread accelerator 410, etc.) may be configured to read embedded tags indicative of a VCID to determine a processing context.

Figure 27:
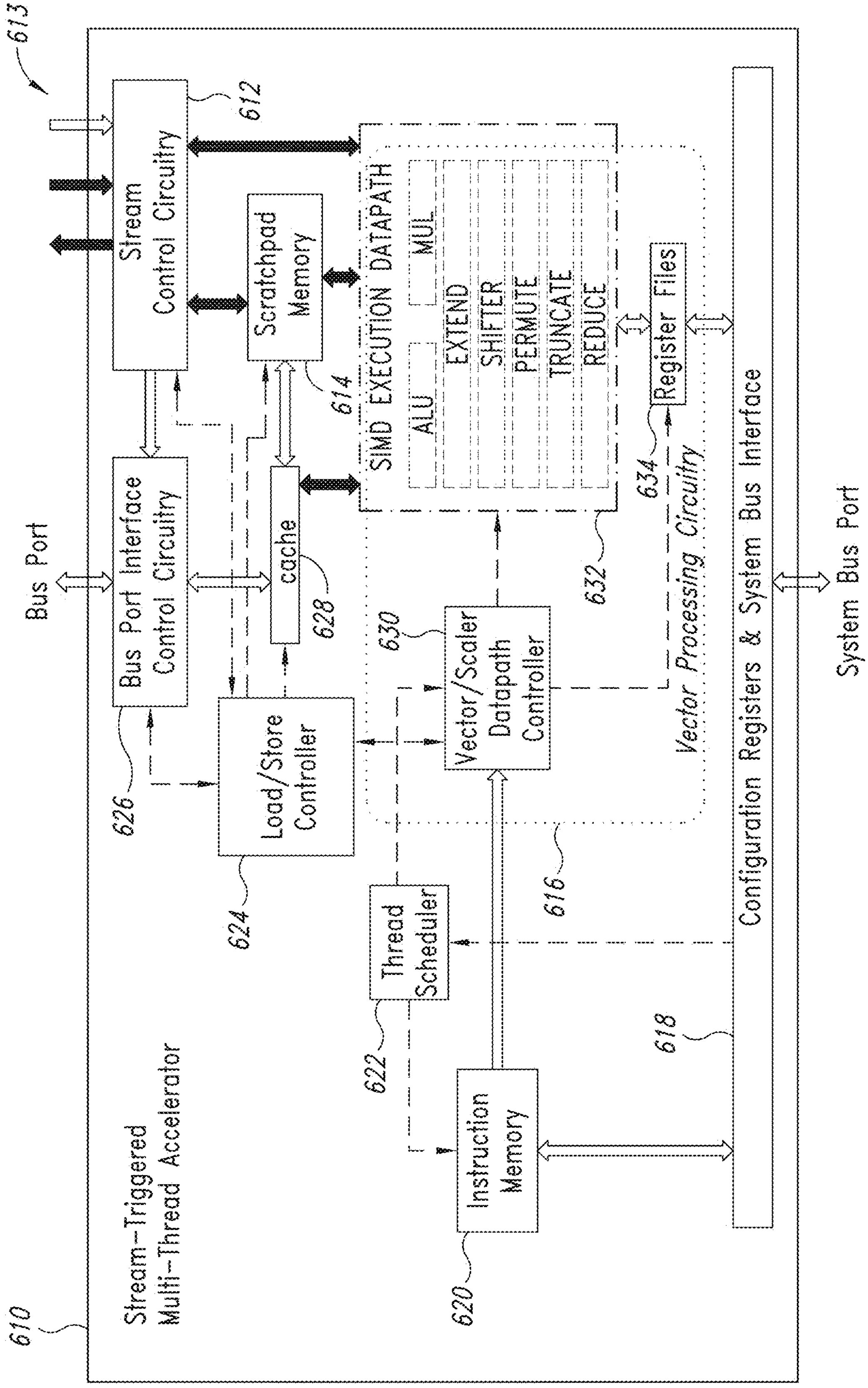
FIG. 27 is a functional block diagram of an embodiment of a stream-triggered multi-thread accelerator.

FIG. 27 is a functional block diagram of an embodiment of a STMT accelerator 610 that may be employed, for example, in the embodiment of the system 400 of FIG. 25 as the STMT accelerator 410, or the embodiment of the system 500 of FIG. 26 as the STMT accelerator 410. The STMT accelerator 610 as illustrated includes stream control circuitry 612, a working or scratchpad memory 614, vector processing circuitry 616, configuration registers and a programming interface 618, an instruction memory 620, a thread scheduler 622, a load/store controller 624, bus port interface control circuitry 626, and a cache memory 628.

The stream control circuitry 612, as illustrated, handles two input data streams of streaming data and an output data stream of streaming data via a plurality of physical stream links 613. Other combinations of input and output data streams and stream links may be employed in some embodiments (e.g., two input streams and two output streams via four stream links 613). In some embodiments, the stream control circuitry 612 and the plurality of physical stream links 613 support virtual data streaming channels (e.g., implemented using embedded context tags). As discussed in more detail below, each virtual input channel can be associated with one or more instruction threads having a set of instructions to implement a computation to be performed on the associated data stream(s), directly or on portions of data streams stored in the scratchpad memory 614. The execution of a thread can be triggered based on the arrival of a threshold amount of data on the data stream(s). The result of a computation can be written directly to an output data stream channel (e.g., to an output virtual channel), stored to a memory (e.g., to the scratchpad memory 614), forwarded to another instruction thread for further processing, etc., and various combinations thereof.

Inter-thread synchronization can be employed. For example, a first instruction thread can generate a trigger to trigger a second instruction thread. A combination of inter-thread synchronization and stream triggering can be employed to build computing pipelines. For example, a first thread can be triggered by a stream (e.g., a threshold amount of data associated with VCID 0). Execution of the first thread can generate a trigger for second thread which consumes a result produced by the first thread, etc.

The vector processing circuitry 616, as illustrated, includes a vector/scalar datapath controller 630, an SIMD execution datapath 632, and one or more register files 634. The SIMD execution data path 632 as illustrated includes an ALU block, a multiplier block, an extend block, a shifter block, a permute block, a truncate block and a reduce block, organized to execute in a pipelined fashion with the pipeline control and flow defined by vector instructions. However, some implementations of the SIMD execution datapath 632 may include fewer processing blocks or circuits than illustrated, may include more processing blocks or circuits than illustrated, may include various combinations of processing blocks or circuits. The SIMD execution data path 632 and the processing blocks included therein can be tailored to particular applications.

The instruction set architecture executed by the vector processing circuitry 616 can support, for example, vector and scalar operations with one destination operand and two source operands. The operands can be a data stream on a stream interface, a register, a memory from an address stored in a register, etc. Scalar operations can be performed, for example, on 32 bit data, and vector operations on data packed into 64 bit data. The vector processing circuitry 616 can, for example, support sub-byte granularity, such as 4, 8, 16, 24, 32 bit data elements in a SIMD implementation packed in 64 bit data packets. Vector instructions can also define extended attributes used by the vector instruction pipeline SIMD execution data path 632, such as auto-increment enablement of operands, element pre-post shift operations, etc., and various combinations thereof.

Figure 28:
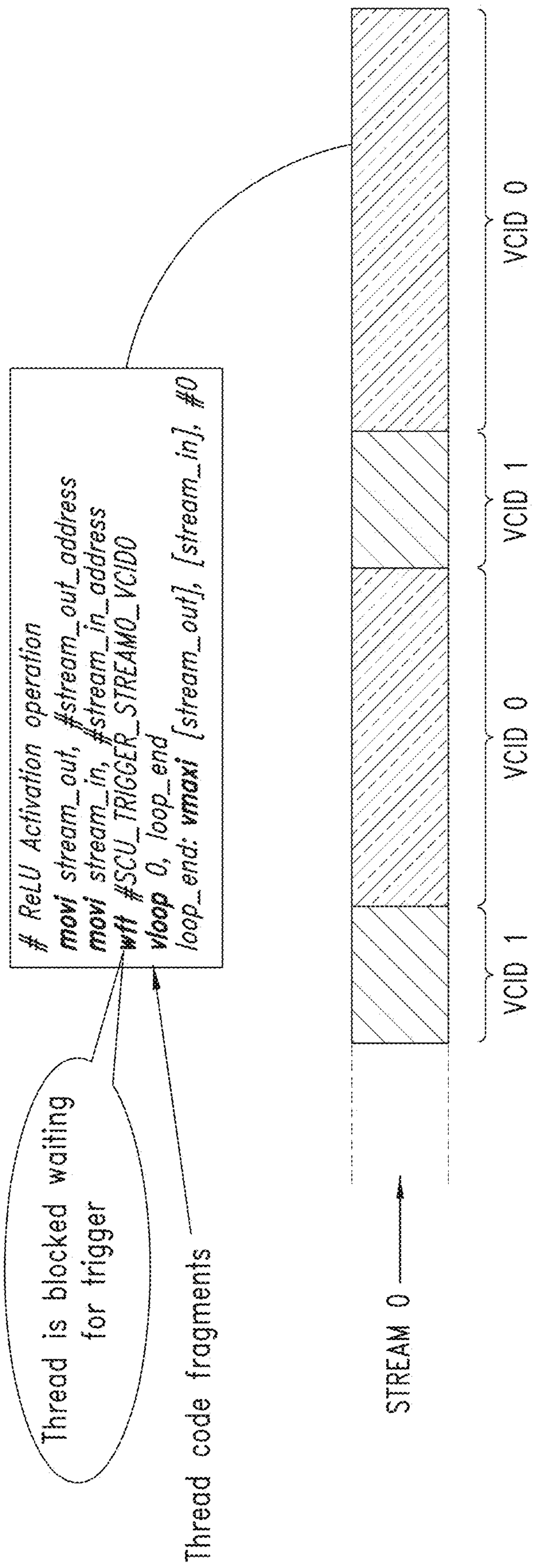
FIGS. 28 and 29 are conceptual diagrams illustrating example use cases of using an embodiment of a stream-triggered multi-thread accelerator to implement processing operations.

FIG. 28 is a conceptual diagram illustrating a first example use case of using a STMT accelerator to implement processing operations. A ReLU activation operation is a common operation performed by deep learning networks. In FIG. 28, a thread code fragment is employed to implement a ReLU activation function using a STMT, such as the STMT 410 of FIGS. 25 and 26, or the STMT 610 of FIG. 27. For convenience, the example of FIG. 28 will be described with reference to the STMT accelerator 610 of FIG. 27.

The instruction thread can be stored in the instruction memory 620, and includes instructions setting the stream in and stream out operands, followed by a wait-for-trigger (wft) instruction. The wft instruction in FIG. 28 is an instruction to wait until a threshold amount of data is received for VCID 0 on physical channel 0. When the trigger criteria are satisfied (e.g., as determined by the stream control circuitry 612), the code fragments to implement the ReLU activation are executed (e.g., by the vector processing circuitry 616 under control of the thread scheduler 622) on the operands indicated in the instruction thread code fragment. As previously mentioned, the operands can be set to data stored in the scratchpad memory 614, streaming data streamed via the stream control circuitry 612, data or data streams received or output via a bus interface (e.g., bus port interface 626 or interface 618) coupled to an external memory, etc., and various combinations thereof.

Figure 29:
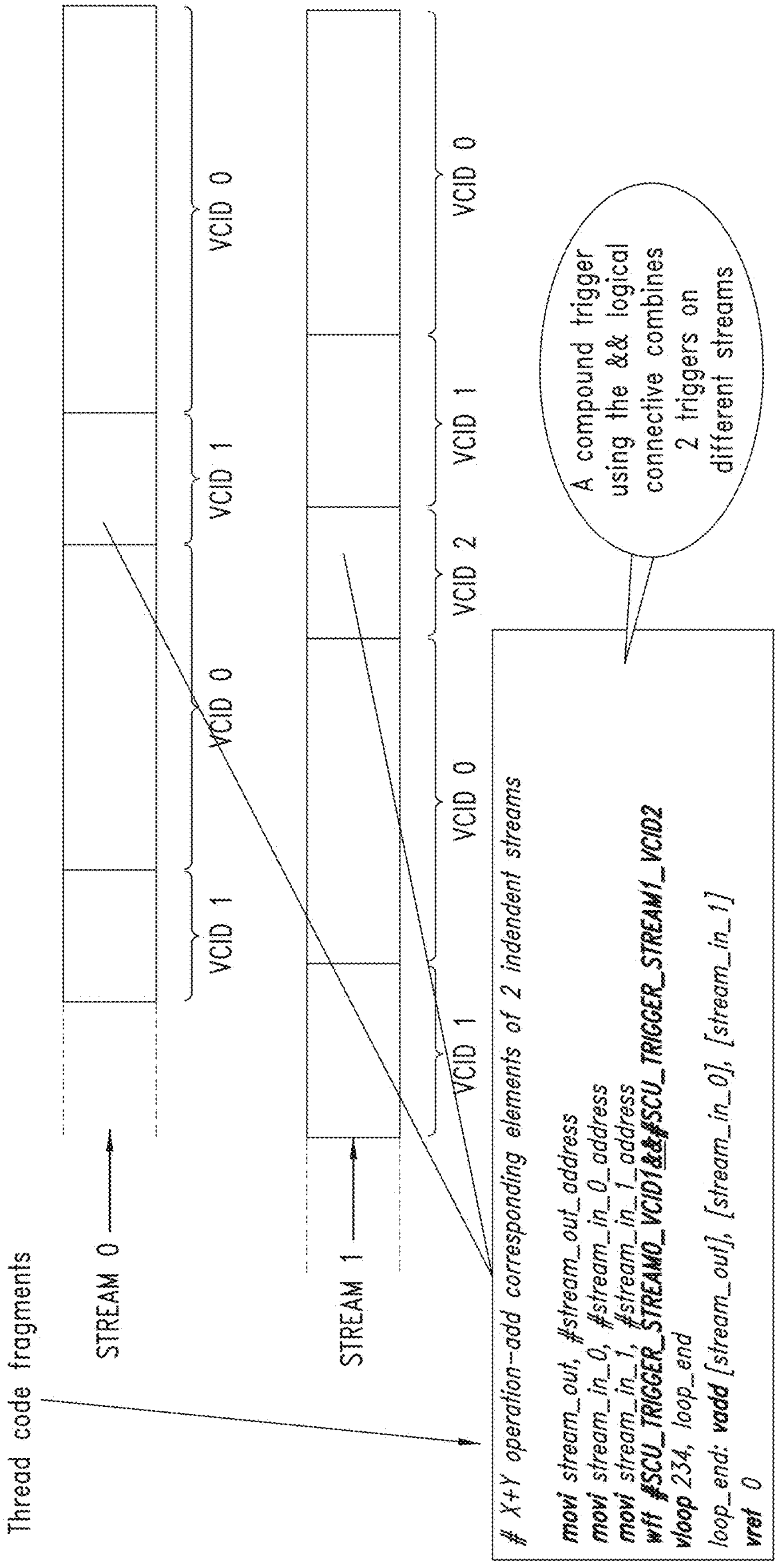

FIG. 29 is a conceptual diagram illustrating a second example use case of using an STMT accelerator to implement processing operations. In the example, an X+Y operation to add corresponding elements of independent data streams is implemented using a thread code fragment executed by a STMT, such as the STMT 410 of FIGS. 25 and 26, or the STMT 610 of FIG. 27. For convenience, the example of FIG. 29 will be described with reference to the STMT accelerator 610 of FIG. 27. The instruction thread can be stored in the instruction memory 620, and includes instructions setting the stream in and stream out operands, followed by a wait-for-trigger (wft) instruction. The wft instruction in FIG. 29 is a compound wft instruction. A first criteria of the compound wft instruction is a first threshold amount of data being received for VCID 1 on physical stream channel 0, and a second criteria of the compound wft instruction is a second threshold amount of data being received for VCID 2 on physical stream channel 1. When both trigger criteria are satisfied (e.g., as determined by the stream control circuitry 612), the code fragments to implement the X+Y operation are executed (e.g., by the vector processing circuitry 616 under control of the thread scheduler 622) on the operands, as illustrated using a zero overhead loop instruction, vloop. As before, the operands can be set to data stored in the scratchpad memory 614, streaming data streamed via the stream control circuitry 612, data or data streams received or output via a bus interface (e.g., bus port interface 626 or interface 618) coupled to an external memory, etc., and various combinations thereof.

For example, data of a data stream may be partially stored in the scratchpad memory 614, and when a threshold amount of data is stored which meets a trigger criteria, operations specified by an instruction thread code fragment can be performed on the stored data. Alternatively, a data stream can be provided by the stream control circuitry 612 directly to the vector processing circuitry 616, providing a latency similar to the latency of other processing elements of a hardware accelerator (e.g., a convolutional accelerator 124, etc.), without buffering. Similarly, the result(s) of the operation(s) can be stored in the scratchpad memory 614, or provided directly in an output data stream.

The instruction thread code fragments, including the operands, the trigger criteria and the instructions to perform the desired operations can be programmed as part of the programming of a processing epoch associated with a hardware accelerator (e.g., hardware accelerator 120 of FIG. 25 or FIG. 26).

With reference to FIG. 27, the scratchpad memory 614 may be implemented, for example, using a dual ported memory, and, in operation, stores portions of input and output operands. The instruction memory 620 may be implemented, for example, using a single port memory, and, in operation, stores instruction code fragments.

The stream control circuitry 612, in operation, controls the flow of streaming data between the stream links 613, the scratchpad memory 614, the vector processing circuitry 616, the bus port interface control circuitry 626, and the configuration registers and interface 618. The stream control circuitry 612 also can determine when trigger criteria associated with wft instructions are satisfied, and control the flow of streaming data based on the determinations of whether the wft criteria are satisfied. As discussed above, the trigger criteria of a wft instruction can be based on embedded context information, such as tags indicating VCIDs, counts of valid data, etc.

Each stream link 613 can be associated with a plurality of buffers, for example, a buffer for each supported embedded context, such as a buffer for each supported virtual channel. Each input channel (e.g., each virtual channel of each stream link 613) can be associated with one or more threads of the instruction thread fragments stored in the instruction memory 620. The scratchpad memory 614 can be configured to store the buffers under the control of the stream control circuitry 612.

Figure 31:
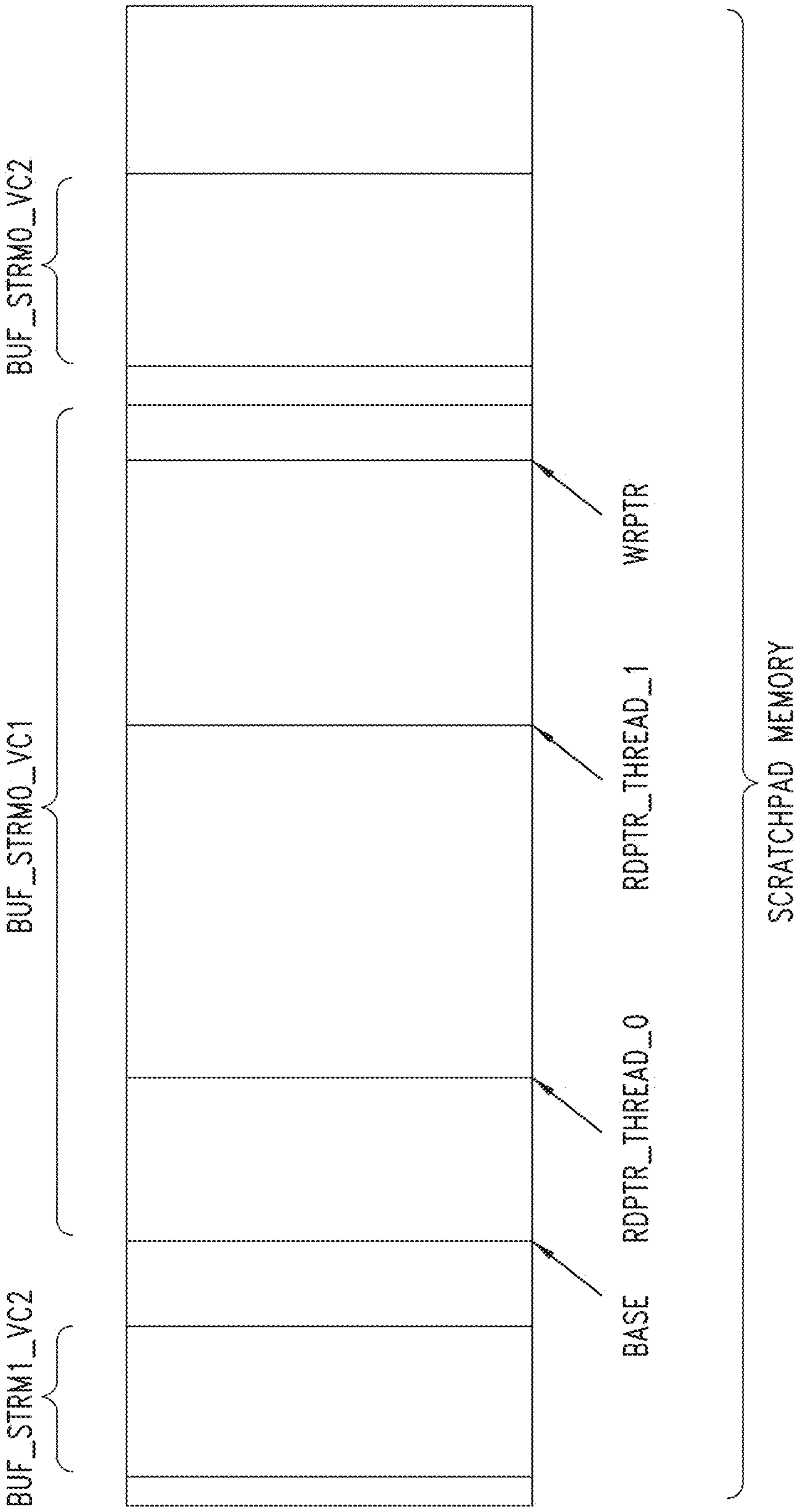

FIGS. 30 and 31 are conceptual diagrams illustrating the buffering of data in a STMT 610, and will be described for convenience with reference to FIG. 27. FIG. 30 illustrates pointers and other information that can be stored in memory registers to implement and control use of buffers in the scratchpad memory 614 by the stream control circuitry 612. FIG. 31 illustrates an example organization of a plurality of buffers in the scratchpad memory 614. The scratchpad memory 614 is divided into blocks that can be allocated to virtual channels and which can be operated on by one or more channels. Each buffer is associated with a stream link 613 and a virtual channel associated with the stream link. In FIG. 30, this is indicated by BUF_STREAMx_VCy, where x represents the stream link 613 number, and y represents a virtual channel supported on the stream link 613. Information can be stored in configuration registers of the stream control circuitry 612 to specify the length of the buffers associated with the virtual channels. The buffer length can be used by the stream control circuitry 612 to manage write pointers, for example to wrap a write pointer back when a buffer is full, in a scenario where a buffer is used as a circular buffer.

As shown in FIG. 31, blocks of memory are allocated to buffer data associated with BUF_STRM1_VC2, to buffer data associated with BUF_STRM0_VC1, and to buffer data associated with BUF_STRM0_VC2. Information can be stored in registers to facilitate the use of the buffers. A BASE address indicates a starting address of a buffer in the scratchpad memory 614 that may be set by the stream control circuitry 612. The BASE address can be stored in a register having a bitfield size based on a depth of the scratchpad memory 614. FIG. 31 shows a BASE address pointer pointing to a starting address for a buffer to buffer data associated with virtual channel BUF_STRM0_VC1.

Read pointers RDPTR_THREAD_tid associated with instruction threads that operate on a virtual channel can be stored in respective registers having bitfield sizes that are based on the depth of the scratchpad memory 614. As illustrated in FIG. 31, a first read pointer RDPTR_THREAD_0 is associated with a thread having a thread ID THREAD_tid of THREAD_0, and a second read pointer RDPTR_THREAD_1 is associated with thread having a thread ID THREAD_tid of THREAD_1. The read pointers RDPTR_THREAD_0 and RDPTR_THREAD_1 are stored for the buffer associated with virtual channel BUF_STRM0_VC1. The read pointers can be updated by the respective thread as data in the buffer is consumed by the thread, or auto updated as data is read (e.g., by adding an offset automatically as data is read), as discussed in more detail below. The number of registers to store the read pointers RDPTR_THREAD_tid can be equal to the number of threads stored in the instruction memory 620. In some implementations, the number of registers may be based on a number of threads stored in the instruction memory 620 that are associated with the virtual channel.

A write pointer WRPTR is updated by the stream control circuitry 612. The write pointer WRPTR can be stored in a register having a bitfield size based on the depth of the scratchpad memory 614.

Trigger thresholds TRIGGER_LEVEL_tid indicating a threshold number of words in the buffer for a virtual channel to trigger a thread may be stored in respective registers for the respective threads. The number of registers can be equal to the number of threads stored in the instruction memory 620 (e.g., the number of threads programmed for a processing epoch). In some implementations, the number of registers may be based on a number of threads stored in the instruction memory 620 that are associated with the virtual channel. The trigger thresholds TRIGGER_LEVEL_tid can be stored in registers having bitfield sizes based on the depth of the scratchpad memory.

Information indicating associations between threads requesting triggers and a virtual channel can be stored as a bitmap in a bitfield having a size equal to the number of threads stored in the instruction memory 620. In some implementations, the number of registers may be based on a number of threads stored in the instruction memory 620 that are associated with the virtual channel. Each bit in the bitmap corresponds to a thread, when a bit is set, the corresponding thread includes a wft instruction associated with the virtual channel.

Information specifying properties of a buffer with respect to instruction threads can be stored. For example, a bitmap can be stored in a register for each instruction thread which indicates buffer properties to be applied to the thread for the virtual channel. As illustrated in FIG. 30, the properties include an auto update property AUTOUPD to update the read pointers RDPTR_THREAD_tid, and a block read property BLKRD to block reading by a thread when there is no data for the thread to read stored in the buffer to stall execution of the thread. A bit in the bitmap can be set to indicate when a property is to be applied to the thread, and to indicate when the property is not to be applied to the thread. As noted above, information can be stored in configuration registers of the stream control circuitry 612 to specify the length of the buffers associated with the virtual channels associated with an instruction thread.

The buffers can be configured to prevent overwriting of data by the stream control circuitry 612 before the data is consumed (e.g., by all of the threads having operands associated with data stored in the buffer), or reading from the buffer by a thread before data associated with the thread is stored in the buffer. For example, the buffer associated with a virtual channel can be a circular buffer, and the pointers RDPTR_THREAD_tid, WRPTR can be used to control writing by the stream control circuitry 612 to prevent premature overwriting of data. If the write pointer WRPTR encounters a read pointer RDPTR_THREAD_tid, the stream control circuitry 612 can stall writing and propagate a stall signal (e.g., via the stream switch 130), to stall a data stream associated with the virtual channel until the previously stored data in the buffer is consumed. Similarly, if a read pointer RDPTR_THREAD_tid encounters the write pointer WRPTR, reading by a thread can be blocked until additional data is written to the thread. These properties can be enabled or disabled for a thread (e.g., using a bitmap) as discussed above.

In some implementations, additional configuration information may be stored and applied. For example, in some implementations, a buffer associated with a virtual channel can be organized as a set of circular buffers, each having a respective base address and pointers and being associated with one or more of the instruction threads. This can facilitate double buffering. While a thread is reading from one of the circular buffers, the stream control circuitry 612 can write additional data to another of the circular buffers. Threshold amounts of data can be used to trigger consumption of the data by a thread.

FIG. 32 is a conceptual diagram illustrating an example configuration of register files 634 of the vector processing circuitry 616 according to an embodiment. The register files 634 as illustrated include scalar registers, accumulation registers, and zero overhead loop registers. Operands of the instructions of the instruction threads can include registers of the register files 634, in addition to memory addresses in memory (e.g., scratchpad memory 614, system memory 104), and streaming data channels (e.g., virtual channels associated with a stream link 613). The zero overhead loop registers can be used to implement zero overhead loop instructions.

FIG. 33 is a conceptual diagram illustrating example instructions of an instruction set architecture according to an embodiment. As illustrated, a first example vector instruction vmov and the operands and extended attributes associated therewith instruct the vector processing circuitry 616 to process 16 four-bit elements stored in vector register 0 (see FIG. 32) by extending the four-bit elements to 16 bits, right shifting each element by 2, and transferring the elements to vector registers 2, 3, 4, and 5. A second example vector instruction vmul and the operands and extended attributes associated therewith instruct the vector processing circuitry 616 to perform a signed multiplication of 8 bit elements of a vector pointed to by vector register 2 with 8 bit elements from stream_in_0, and write the result to an output stream. After the multiplication is performed, the address stored in vector register 2 is incremented by 1. As noted above, the operands can be data streams, in addition to be vector or scalar operands.

A third example vector instruction vmaxreduce and the operands and extended attributes associated therewith instruct the vector processing circuitry to determine a largest 4 bit element in a vector pointed to by an address stored in vector register 2, and write the result to an address pointed to by vector register 3. An example scalar instruction, add and the operands associated therewith instruct the vector processing circuitry 616 to perform a scalar operation adding the data stored in two 32 bit registers sr0, sr1, and write the result to sr2.

FIGS. 34A and 34B are conceptual diagrams illustrating an example configuration of an instruction set architecture (ISA) according to an embodiment. The ISA has a plurality of bitfields. A destination operand dest_operand indicates a destination for a result of the instruction, and the destination can be an address in a memory (e.g., an address in scratchpad memory 614), a register (e.g., a register in the register files 634) or a data stream (e.g., a data stream on a stream link 613). Source operands src_operand1, src_operand2 indicate data sources for the instruction, and the sources can be addresses in a memory (e.g., addresses in scratchpad memory 614), registers (e.g., registers in the register files 634) or data streams (e.g., data streams on a stream link 613). Operand type fields dest_operand-type, src1_operand_type, src2_operand_type indicate a type of the corresponding operand (e.g., memory address, register, or stream). An unsignedness field indicates whether operations are to be signed. As illustrated, when set operations are unsigned, otherwise, operations are signed. Datawidth fields indicate the width of the source and destination operands. An opcode field indicates the type of operation to be performed, and ISA type field indicates a type of the ISA. As illustrated, a reserve field is reserved for future use. FIGS. 35A and 35B are conceptual diagrams illustrating extended attributes of a 64 bit instruction according to an embodiment. The extended attributes can be selected based on extensions useful in particular applications.

With reference to FIG. 27, the thread scheduler 622, in operation, determines which thread of the threads that are ready to be executed to execute in a cycle. Interleaved multi-threading techniques and priority schemes can be employed by the thread scheduler 622 to schedule execution of ready threads in a sequence of data cycles. For example, an interleaved scheduling policy can consider data streaming and consumption rates to set priority levels for threads of the threads, which are ready to execute while also switching between threads in each cycle. A scheduling policy with employs both multi-thread interleaving combined with consideration of thread priorities facilitate reducing stalls and other timing issues (e.g., pipelining issues), and increasing overall throughput.

A set of triggers with associated trigger IDs can be defined for use in instruction threads stored in the instruction memory 620 and by the stream control circuitry 612. For example, for two stream links 613 with four virtual channels each, a set of 8 triggers can be defined with associated trigger IDs 0-7. Additional general purpose triggers with associated trigger IDs can be defined to facilitate interthread synchronization. Configuration information related to the defined triggers and associated trigger IDs can be stored in configuration registers.

Additional configuration registers can be employed to store information such as boot program counter registers to store thread start addresses, and thread enable register to determine which threads are valid or invalid (e.g., in a bitmap), address mask registers to assist the load/store controller 624 control circuitry in distinguishing between access to accelerator internal address spaces (e.g., instruction memory 620, scratchpad memory 614, register files 634) and external address spaces (e.g., system memory 104), etc.

In one example, a hardware accelerator (120) includes a stream switch (130, a programmable component (124, 126, 128, 324) and multi-context control circuitry (150, 250, 350). The stream switch, in operation, streams a data stream to the programmable component and to the multi-context control circuitry. The multi-context control circuitry, in a configured context mode of operation, counts valid data transactions of the data stream streamed to the programmable component, and controls a sequence of processing operations to be performed on the data of the data stream by the programmable component based on the counting of the valid data transactions of the data stream and on stored configured-context mode configuration information.

In an embodiment, the multi-context control circuitry, in operation, compares current counts of the valid data transactions to threshold counts and controls the sequence of processing operations to be performed on the data of the data stream by the programmable component based on the comparing.

In an embodiment, the multi-context control circuitry, in an embedded context mode of operation, monitors the data stream to read embedded context tags, and controls the sequence of processing operations based on the embedded context tags in the data stream and stored embedded-context mode configuration information. In an embodiment, the embedded context tags in the data stream identify virtual data channels associated with data of the data stream.

In an embodiment, the multi-context control circuitry, in a hybrid context mode of operation: monitors the data stream to read embedded context tags; counts valid data transactions of the data stream streamed to the programmable component and the multi-context control circuitry via the stream switch; and controls a sequence of processing operations to be performed on the data of the data stream by the programmable component based on the embedded context tags, on the counting of the valid data transactions of the data stream, and on stored hybrid-context mode configuration information. In an embodiment, the embedded context tags identify virtual data channels associated with data of the data stream.

In an embodiment, the multi-context control circuitry includes configuration registers (252), which, in operation, store configuration information.

In an embodiment, the monitored tags include a plurality of tags indicating respective virtual channel IDs of a plurality of virtual channel IDs, and the multi-context control circuitry includes a plurality of sets of configuration registers (252), which, in operation, store configuration information associated with respective virtual channel IDs of the plurality of virtual channel IDs.

In an embodiment, the multi-context control circuitry, in operation, retrieves stored configuration information from an external memory (104).

In an embodiment, the stored configuration information indicates, for each of a plurality of context types: a function to be performed on data of the data stream; a number of values in the data stream to be processed before switching to a next context type; a repeat flag; a next context; a number of times to repeat a context type; or combinations thereof.

In an embodiment, the multi-context control circuitry, in the hybrid mode of operation, implements a plurality of finite state machines (258) corresponding to a number of embedded context tags supported by the multi-context control circuitry.

In an embodiment, the multi-context control circuitry implements an arbitration state machine (260) to select a streaming output context of the programmable component from a plurality of streaming output contexts generated by respective finite state machines of the plurality of finite state machines.

In an embodiment, a system (100) comprises a plurality of hardware accelerators (120). Each hardware accelerator of the plurality of hardware accelerators includes a plurality of programmable components (124, 126, 128, 224', 324), multi-context control circuitry (150, 250) coupled to the plurality of programmable components, and a stream switch (130) coupled to the plurality of programmable components and to the multi-context control circuitry. The stream switch of a hardware accelerator of the plurality of hardware accelerators, in operation, streams a data stream to a programmable component of the plurality of programmable components of the hardware accelerator and to the multi-context control circuitry of the hardware accelerator. The multi-context control circuitry of the hardware accelerator, in a configured context mode of operation, counts valid data transactions of the data stream streamed to the programmable component and the multi-context control circuitry via the stream switch, and controls a sequence of processing operations to be performed on the data of the data stream by the programmable component based on the counting of the valid data transactions of the data stream and on stored configured-context mode configuration information. In an embodiment, the multi-context control circuitry, in operation, compares current counts of the valid data transactions to threshold counts and controls the sequence of processing operations to be performed on the data of the data stream by the programmable component based on the comparing.

In an embodiment, the system (100) comprises a host processor (102) coupled to the plurality of hardware accelerators, wherein the host processor, in operation, controls storage of stored configuration information.

In an embodiment, the multi-context control circuitry, in an embedded context mode of operation, monitors the data stream to read embedded context tags, and controls the sequence of processing operations based on the embedded context tags in the data stream and stored embedded-context mode configuration information.

In an embodiment, the multi-context control circuitry, in a hybrid context mode of operation: monitors the data stream to read embedded context tags; counts valid data transactions of the data stream streamed to the programmable component and the multi-context control circuitry via the stream switch; and controls a sequence of processing operations to be performed on the data of the data stream by the programmable component based on the embedded context tags, on the counting of the valid data transactions of the data stream, and on stored hybrid-context mode configuration information.

In an embodiment, the embedded context tags identify virtual data channels associated with data of the data stream.

In an embodiment, the plurality of programmable components of the hardware accelerator of the plurality of hardware accelerators include programmable processing elements, programmable convolutional accelerators, programmable functional logic circuits, or combinations thereof.

In another example, a method (2400) comprises streaming (2408) a data stream to a programmable component of a stream-based programmable hardware accelerator via a stream switch, counting (2412) valid data transactions of the data stream streamed to the programmable component via the stream switch, and controlling (2414), using multi-context control circuitry in a configured context mode of operation, a sequence of processing operations performed on the data of the data stream by the programmable component based on the counting of the valid data transactions of the data stream and on stored configured-context mode configuration information.

In an embodiment, the method comprises comparing current counts of the valid data transactions to threshold counts and controlling the sequence of processing operations to be performed on the data of the data stream based on the comparing.

In an embodiment, the method comprises, in an embedded context mode of operation of the multi-context control circuitry, monitoring the data stream to read embedded context tags (2416), and controlling the sequence of processing operations based on the embedded context tags in the data stream and stored embedded-context mode configuration information (2418).

In an embodiment, the method comprises identifying virtual data channels associated with the data stream based on the embedded context tags.

In an embodiment, the method comprises, in a hybrid context mode of operation of the multi-context control circuitry, monitoring the data stream to read embedded context tags (2420), counting valid data transactions of the data stream streamed to the programmable component via the stream switch (2422), and controlling a sequence of processing operations to be performed on the data of the data stream based on the embedded context tags, on the counting of the valid data transactions of the data stream, and on stored hybrid-context mode configuration information (2424).

In an embodiment, the method comprises storing the configuration information (2404). In an embodiment, the method comprises retrieving stored configuration information from a memory.

In an embodiment, the stored configuration information indicates, for each of a plurality of context types: a function to be performed on data of the data stream; a number of values in the data stream to be processed before switching to a next context type; a repeat flag; a next context; a number of times to repeat a context type; or combinations thereof.

In another example, a non-transitory computer-readable medium stores contents which configures a stream-based programmable hardware accelerator to perform a method. The method (2400) comprises streaming (2408) a data stream to a stream-based programmable hardware accelerator via a stream switch, counting (2412) valid data transactions of the data stream streamed to the stream-based hardware accelerator via the stream switch, and controlling (2414), using multi-context control circuitry in a configured context mode of operation, a sequence of processing operations performed on the data of the data stream by the stream-based hardware accelerator based on the counting of the valid data transactions of the data stream and on stored configured-context mode configuration information.

In an embodiment, the method comprises comparing current counts of the valid data transactions to threshold counts and controlling the sequence of processing operations to be performed on the data of the data stream based on the comparing.

In an embodiment, the method comprises: monitoring the data stream to read embedded context tags; and controlling the sequence of processing operations to be performed on the data of the data stream based on the embedded context tags, on the counting of the valid data transactions of the data stream, and on the stored configuration information.

In an embodiment, the contents comprise the stored configuration information.

In an embodiment, the stored configuration information comprises, for each of a plurality of context types: a function to be performed on data of the data stream; a number of values in the data stream to be processed before switching to a next context type; a repeat flag; a next context; a number of times to repeat a context type; or combinations thereof.

In an embodiment, the contents comprise instructions executable by the stream-based programmable hardware accelerator.

In another example, a stream-triggered multi-thread accelerator includes a data streaming interface, a memory, vector processing circuitry and scheduling circuitry. The data streaming interface, in operation, receives and transmits data streams of a plurality of data streaming channels. The memory, in operation, stores a plurality of instruction threads. The plurality of instruction threads include wait-for-trigger instructions specifying streaming data trigger thresholds, and instructions having data streaming channels of the plurality of data streaming channels as operands. The vector processing circuitry is coupled to the memory and to the data streaming interface. The vector processing circuitry, in operation, executes instruction threads of the plurality of instruction threads. The scheduling circuitry, in operation, schedules execution of instruction threads of the plurality of instruction threads by the vector processing circuitry based on the streaming data trigger thresholds of the wait-for-trigger instructions.

In an embodiment, the plurality of data streaming channels are virtual data streaming channels and the data streaming interface, in operation, receives data streams via multiple stream links supporting the plurality of virtual data streaming channels. In an embodiment, an instruction thread of the plurality of instruction threads includes a wait-for-trigger instruction specifying a streaming data trigger threshold associated with a virtual data streaming channel of the plurality of virtual data streaming channels.

In an embodiment, an instruction thread of the plurality of instruction threads includes a compound trigger instruction specifying a first streaming data trigger threshold associated with a first virtual data streaming channel and a second streaming data trigger threshold associated with a second virtual data streaming channel.

In an embodiment, the memory includes: an instruction memory, which, in operation, stores the instruction threads; a scratchpad memory, which, in operation, buffers data associated with virtual data streaming channels of the plurality of virtual data streaming channels; and configuration registers, which, in operation, store configuration information associated with virtual data streaming channels of the plurality of data streaming channels. In an embodiment, the configuration information associated with a data streaming channel includes a trigger ID and a data threshold.

In an embodiment, the stream-triggered multi-thread accelerator comprises stream control circuitry coupled to the data streaming interface and to the scratchpad memory, wherein the stream control circuitry, in operation, controls storage of data associated with the virtual data streaming channels in the scratchpad memory. In an embodiment, the stream control circuitry implements pointers to control the storage of data associated with the virtual data streaming channels in the scratchpad memory. In an embodiment, the stream control circuitry implements stream stall protocols to control the flow of data in the virtual data streaming channels.

In an embodiment, the vector processing circuitry supports an instruction set architecture including scaler operations, and vector operations.

In an embodiment, the plurality of instruction threads include instructions having memory register operands, memory address operands, data streaming channel operands, or combinations thereof.

In an embodiment, the scheduling circuitry, in operation, interleaves execution of instruction threads of the plurality of instruction threads by the vector processing circuitry.

In an embodiment, the scheduling circuitry, in operation, schedules execution of instruction threads of the plurality of instruction threads by the vector processing circuitry based on priorities associated with instruction threads of the plurality of instruction threads.

In an embodiment, an instruction thread of the plurality of instruction threads has a single active vector instruction.

In an embodiment, a system comprises a stream switch and a plurality of programmable components coupled to the stream switch. The plurality of programmable components includes a stream-triggered multi-thread accelerator. The stream-triggered multi-thread accelerator includes a data streaming interface coupled to the stream switch, a memory, and processing circuitry. The data streaming interface, in operation, receives and transmits data streams of a plurality of data streaming channels. The memory, in operation, stores a plurality of instruction threads. The plurality of instruction threads includes wait-for-trigger instructions specifying streaming data trigger thresholds, and instructions having data streaming channels of the plurality of data streaming channels as operands. The processing circuitry is coupled to the memory and to the data streaming interface. The processing circuitry, in operation, executes instruction threads of the plurality of instruction threads based on the streaming data trigger thresholds of the wait-for-trigger instructions.

In an embodiment, the system comprises multi-context control circuitry coupled to the stream-triggered multi-thread accelerator, wherein the multi-context control circuitry, in operation, provides context information to the stream-triggered multi-thread accelerator.

In an embodiment, the plurality of data streaming channels are virtual data streaming channels and the data streaming interface, in operation, receives data streams via multiple stream links supporting the plurality of virtual data streaming channels.

In an embodiment, an instruction thread of the plurality of instruction threads includes a compound trigger instruction specifying a first streaming data trigger threshold associated with a first virtual data streaming channel and a second streaming data trigger threshold associated with a second virtual data streaming channel.

In an embodiment, the stream-triggered multi-thread accelerator comprises stream control circuitry coupled to the data streaming interface, wherein the stream control circuitry, in operation, controls storage of data associated with the virtual data streaming channels in the memory using data pointers and stall protocols.

In an embodiment, the system comprises a host processor, host memory, and a system bus coupled to the host processor and the host memory. The stream-triggered multi-thread accelerator includes a bus interface and the plurality of instruction threads includes instructions having operands corresponding to addresses in the host memory.

In an embodiment, the plurality of instruction threads include instructions: having data streaming channels of the plurality of data streaming channels as destination operands; having data streaming channels of the plurality of data streaming channels as source operands; or combinations thereof.

In an embodiment, a method comprises streaming data streams of a plurality of data streaming channels to a stream-triggered multi-thread accelerator via a stream switch, and executing instruction threads of a plurality of instruction threads using the stream-triggered multi-thread accelerator. The plurality of instruction threads include wait-for-trigger instructions specifying streaming data trigger thresholds, and instructions having data streaming channels of the plurality of data streaming channels as operands. The executing instruction threads of the plurality of instruction threads includes scheduling execution of instruction threads of the plurality of instruction threads based on the streaming data trigger thresholds of the wait-for-trigger instructions. In an embodiment, the plurality of data streaming channels are virtual data streaming channels.

In an embodiment, an instruction thread of the plurality of instruction threads includes a wait-for-trigger instruction specifying a streaming data trigger threshold associated with a virtual data streaming channel of the plurality of virtual data streaming channels.

In an embodiment, an instruction thread of the plurality of instruction threads includes a compound trigger instruction specifying a first streaming data trigger threshold associated with a first virtual data streaming channel and a second streaming data trigger threshold associated with a second virtual data streaming channel.

In an embodiment, the method comprises storing the instruction threads of the plurality of instruction threads in an instruction memory of the stream-triggered multi-thread accelerator, buffering data associated with virtual data streaming channels of the plurality of virtual data streaming channels in a scratchpad memory of the stream-triggered multi-thread accelerator, and storing configuration information associated with virtual data streaming channels of the plurality of data streaming channels in configuration registers of the stream-triggered multi-thread accelerator. In an embodiment, the configuration information associated with a data streaming channel includes a trigger ID and a data threshold.

In an embodiment, the method comprises implementing pointers to control storage of data associated with the virtual data streaming channels in the scratchpad memory.

In an embodiment, the method comprises implementing stream stall protocols to control the flow of data in the virtual data streaming channels.

In an embodiment, the plurality of instruction threads include instructions having memory register operands, memory address operands, data streaming channel operands, or combinations thereof.

In an embodiment, the scheduling execution of instruction threads of the plurality of instruction threads includes interleaving execution of instruction threads of the plurality of instruction threads.

In an embodiment, the scheduling execution of instruction threads of the plurality of instruction threads is based on priorities associated with instruction threads of the plurality of instruction threads.

In an embodiment, a non-transitory computer-readable medium's contents configure a stream-triggered multi-thread accelerator to perform a method. The method comprises receiving data streams of a plurality of data streaming channels via a stream switch and executing instruction threads of a plurality of instruction threads. The plurality of instruction threads include wait-for-trigger instructions specifying streaming data trigger thresholds, and instructions having data streaming channels of the plurality of data streaming channels as operands. The executing instruction threads of the plurality of instruction threads includes scheduling execution of instruction threads of the plurality of instruction threads based on the streaming data trigger thresholds of the wait-for-trigger instructions. In an embodiment, the plurality of data streaming channels are virtual data streaming channels.

In an embodiment, an instruction thread of the plurality of instruction threads includes a compound trigger instruction specifying a first streaming data trigger threshold associated with a first virtual data streaming channel and a second streaming data trigger threshold associated with a second virtual data streaming channel.

In an embodiment, the method comprises: storing the instruction threads of the plurality of instruction threads in an instruction memory of the stream-triggered multi-thread accelerator; buffering data associated with virtual data streaming channels of the plurality of virtual data streaming channels in a scratchpad memory of the stream-triggered multi-thread accelerator; and storing configuration information associated with virtual data streaming channels of the plurality of data streaming channels in configuration registers of the stream-triggered multi-thread accelerator.

In an embodiment, the contents comprise the plurality of instruction threads.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hardware accelerator, comprising:
- a programmable component;
- multi-context control circuitry coupled to the programmable component; and
- a stream switch coupled to the programmable component and to the multi-context control circuitry, wherein,
- the stream switch, in operation, streams a data stream to the programmable component and to the multi-context control circuitry, and
- the multi-context control circuitry, in a configured context mode of operation:
  - counts valid data transactions of the data stream streamed to the programmable component and the multi-context control circuitry via the stream switch; and
  - controls a sequence of processing operations to be performed on the data of the data stream by the programmable component based on the counting of the valid data transactions of the data stream and on stored configured-context mode configuration information.

2. The hardware accelerator of claim 1, wherein the multi-context control circuitry, in operation, compares current counts of the valid data transactions to threshold counts and controls the sequence of processing operations to be performed on the data of the data stream by the programmable component based on the comparing.

3. The hardware accelerator of claim 1, wherein the multi-context control circuitry, in an embedded context mode of operation, monitors the data stream to read embedded context tags, and controls the sequence of processing operations based on the embedded context tags in the data stream and stored embedded-context mode configuration information.

4. The hardware accelerator of claim 3, wherein the embedded context tags in the data stream identify virtual data channels associated with data of the data stream.

5. The hardware accelerator of claim 1, wherein the multi-context control circuitry, in a hybrid context mode of operation:
- monitors the data stream to read embedded context tags;
- counts valid data transactions of the data stream streamed to the programmable component and the multi-context control circuitry via the stream switch; and
- controls a sequence of processing operations to be performed on the data of the data stream by the programmable component based on the embedded context tags, on the counting of the valid data transactions of the data stream, and on stored hybrid-context mode configuration information.

6. The hardware accelerator of claim 5, wherein the embedded context tags identify virtual data channels associated with data of the data stream.

7. The hardware accelerator of claim 6, wherein the multi-context control circuitry includes configuration registers, which, in operation, store configuration information.

8. The hardware accelerator of claim 5, wherein the monitored tags include a plurality of tags indicating respective virtual channel IDs of a plurality of virtual channel IDs, and the multi-context control circuitry includes a plurality of sets of configuration registers, which, in operation, store configuration information associated with respective virtual channel IDs of the plurality of virtual channel IDs.

9. The hardware accelerator of claim 1, wherein the multi-context control circuitry, in operation, retrieves stored configuration information from an external memory.

10. The hardware accelerator of claim 1, wherein the stored configured-context mode configuration information indicates, for each of a plurality of context types:
- a function to be performed on data of the data stream;
- a number of values in the data stream to be processed before switching to a next context type;
- a repeat flag;
- a next context;
- a number of times to repeat a context type; or
- combinations thereof.

11. The hardware accelerator of claim 5, wherein the multi-context control circuitry, in the hybrid mode of operation, implements a plurality of finite state machines corresponding to a number of embedded context tags supported by the multi-context control circuitry.

12. The hardware accelerator of claim 11, wherein the multi-context control circuitry implements an arbitration state machine to select a streaming output context of the programmable component from a plurality of streaming output contexts generated by respective finite state machines of the plurality of finite state machines.

13. A system, comprising:
- a plurality of hardware accelerators, each including:
  - a plurality of programmable components;
  - multi-context control circuitry coupled to the plurality of programmable components; and a stream switch coupled to the plurality of programmable components and to the multi-context control circuitry, wherein, the stream switch of a hardware accelerator of the plurality of hardware accelerators, in operation, streams a data stream to a programmable component of the plurality of programmable components of the hardware accelerator and to the multi-context control circuitry of the hardware accelerator, and the multi-context control circuitry of the hardware accelerator, in a configured context mode of operation:

counts valid data transactions of the data stream streamed to the programmable component and the multi-context control circuitry via the stream switch; and controls a sequence of processing operations to be performed on the data of the data stream by the programmable component based on the counting of the valid data transactions of the data stream and on stored configured-context mode configuration information.

14. The system of claim 13, wherein the multi-context control circuitry, in operation, compares current counts of the valid data transactions to threshold counts and controls the sequence of processing operations to be performed on the data of the data stream by the programmable component based on the comparing.

15. The system of claim 14, comprising:

a host processor coupled to the plurality of hardware accelerators, wherein the host processor, in operation, controls storage of the stored configured-context mode configuration information.

16. The system of claim 13, wherein the multi-context control circuitry, in an embedded context mode of operation, monitors the data stream to read embedded context tags, and controls the sequence of processing operations based on the embedded context tags in the data stream and stored embedded-context mode configuration information.

17. The system of claim 13, wherein the multi-context control circuitry, in a hybrid context mode of operation:

monitors the data stream to read embedded context tags;

counts valid data transactions of the data stream streamed to the programmable component and the multi-context control circuitry via the stream switch; and controls a sequence of processing operations to be performed on the data of the data stream by the programmable component based on the embedded context tags, on the counting of the valid data transactions of the data stream, and on stored hybrid-context mode configuration information.

18. The system of claim 17, wherein the embedded context tags identify virtual data channels associated with data of the data stream.

19. The system of claim 13, wherein the plurality of programmable components of the hardware accelerator of the plurality of hardware accelerators include:

programmable processing elements;

programmable convolutional accelerators;

programmable functional logic circuits; or combinations thereof.

20. A method, comprising:

streaming a data stream to a programmable component of a stream-based programmable hardware accelerator via a stream switch;

counting valid data transactions of the data stream streamed to the programmable component via the stream switch; and controlling, using multi-context control circuitry in a configured context mode of operation, a sequence of processing operations performed on the data of the data stream by the programmable component based on the counting of the valid data transactions of the data stream and on stored configured-context mode configuration information.

21. The method of claim 20, comprising comparing current counts of the valid data transactions to threshold counts and controlling the sequence of processing operations to be performed on the data of the data stream based on the comparing.

22. The method of claim 20, comprising, in an embedded context mode of operation of the multi-context control circuitry, monitoring the data stream to read embedded context tags, and controlling the sequence of processing operations based on the embedded context tags in the data stream and stored embedded-context mode configuration information.

23. The method of claim 22, comprising identifying virtual data channels associated with the data stream based on the embedded context tags.

24. The method of claim 20, comprising, in a hybrid context mode of operation of the multi-context control circuitry:

monitoring the data stream to read embedded context tags;

counting valid data transactions of the data stream streamed to the programmable component via the stream switch; and controlling a sequence of processing operations to be performed on the data of the data stream based on the embedded context tags, on the counting of the valid data transactions of the data stream, and on stored hybrid-context mode configuration information.

25. The method of claim 20, comprising storing the configured-context mode configuration information.

26. The method of claim 25, comprising retrieving the stored configured-context mode configuration information from a memory.

27. The method of claim 25, wherein the stored configured-context mode configuration information indicates, for each of a plurality of context types:

a function to be performed on data of the data stream;

a number of values in the data stream to be processed before switching to a next context type;

a repeat flag;

a next context;

a number of times to repeat a context type; or combinations thereof.

28. A non-transitory computer-readable medium storing contents which configure a stream-based programmable hardware accelerator to perform a method, the method comprising:

streaming a data stream to a programmable processing component of the programmable hardware accelerator via a stream switch;

counting valid data transactions of the data stream streamed to the programmable processing component of the stream-based hardware accelerator via the stream switch; and controlling, using multi-context control circuitry in a configured context mode of operation, a sequence of processing operations performed on the data of the data stream by the programmable processing component based on the counting of the valid data transactions of the data stream and on stored context configuration information.

29. The non-transitory computer-readable medium of claim 28, wherein the method comprises comparing current counts of the valid data transactions to threshold counts and controlling the sequence of processing operations to be performed on the data of the data stream based on the comparing.

30. The non-transitory computer-readable medium of claim 28, wherein the method comprises:

monitoring the data stream to read embedded context tags; and controlling the sequence of processing operations to be performed on the data of the data stream based on the embedded context tags, and on the counting of the valid data transactions of the data stream, and on the stored context configuration information.

31. The non-transitory computer-readable medium of claim 28, wherein the contents comprise the stored context configuration information.

32. The non-transitory computer-readable medium of claim 31, wherein the stored context configuration information comprises, for each of a plurality of context types:

a function to be performed on data of the data stream;

a number of values in the data stream to be processed before switching to a next context type;

a repeat flag;

a next context;

a number of times to repeat a context type; or combinations thereof.

33. The non-transitory computer-readable medium of claim 31, whether the contents comprise instructions executable by the stream-based programmable hardware accelerator.

* * * * *